US007185355B1

(12) United States Patent
Ellis et al.

(10) Patent No.: US 7,185,355 B1
(45) Date of Patent: Feb. 27, 2007

(54) PROGRAM GUIDE SYSTEM WITH PREFERENCE PROFILES

(75) Inventors: Michael D. Ellis, Boulder, CO (US); Edward B. Knudson, Littleton, CO (US); Thomas R. Lemmons, Sand Springs, OK (US); Joel G. Hassell, Arvada, CO (US); Robert A. Knee, Lansdale, PA (US); Kevin B. Easterbrook, Monument, CO (US)

(73) Assignee: United Video Properties, Inc., Los Angeles, CA (US)

( * ) Notice: Subject to any disclaimer, the term of this patent is extended or adjusted under 35 U.S.C. 154(b) by 0 days.

(21) Appl. No.: 09/034,934

(22) Filed: Mar. 4, 1998

(51) Int. Cl.
*G06F 3/00* (2006.01)
*G06F 13/00* (2006.01)
*H04N 5/455* (2006.01)

(52) U.S. Cl. .............................. 725/46; 725/42; 725/47
(58) Field of Classification Search .................... 725/9, 725/10, 39, 42, 45, 46, 25, 47
See application file for complete search history.

(56) References Cited

U.S. PATENT DOCUMENTS

| 4,081,753 A | 3/1978 | Miller ........................ 325/396 |
| 4,170,782 A | 10/1979 | Miller ........................ 358/84 |
| 4,271,532 A | 6/1981 | Wine ........................ 455/186 |
| 4,367,559 A | 1/1983 | Tults ........................ 455/186 |
| 4,375,651 A | 3/1983 | Templin et al. .......... 358/191.1 |
| 4,381,522 A | 4/1983 | Lambert ..................... 358/86 |
| 4,390,901 A | 6/1983 | Keiser ....................... 358/147 |
| 4,425,579 A | 1/1984 | Merrell ........................ 358/86 |
| 4,429,385 A | 1/1984 | Cichelli et al. ............... 370/92 |
| 4,495,654 A | 1/1985 | Deiss ......................... 455/151 |
| 4,527,194 A | 7/1985 | Sirazi ......................... 358/86 |
| 4,641,205 A | 2/1987 | Beyers, Jr. ................. 360/33.1 |
| 4,689,022 A | 8/1987 | Peers et al. ................. 434/307 |
| 4,706,121 A | 11/1987 | Young |
| 4,754,326 A | 6/1988 | Kram et al. ................. 364/900 |
| 4,908,713 A | 3/1990 | Levine ....................... 358/335 |
| 4,959,719 A | 9/1990 | Strubbe et al. |
| 4,963,994 A | 10/1990 | Levine ....................... 358/335 |
| 5,038,211 A | 8/1991 | Hallenbeck ................. 358/142 |

(Continued)

FOREIGN PATENT DOCUMENTS

DE 42 01 031 C2 9/1994

(Continued)

*Primary Examiner*—Kieu-Oanh Bui
(74) *Attorney, Agent, or Firm*—Fish & Neave IP Group Ropes & Gray LLP; Tae Bum Shin

(57) ABSTRACT

An interactive television program guide system is provided in which a user may inform a program guide of the user's interests. Information on the user's interests may be stored in a preference profile. There may be more than one preference profile, each for a different user. Each preference profile contains a number of preference attributes (program titles, genres, viewing times, channels, broadcast characteristics, etc.). A preference level (e.g., strong or weak like, strong or weak dislike, illegal, mandatory, don't care, etc.) that is indicative of the user's level of interest is associated with each preference attribute. Preference profiles may be used to restrict the programs that are listed in various program listings display screens and may be used to limit the channels to which the program guide allows the user to tune.

348 Claims, 33 Drawing Sheets

U.S. PATENT DOCUMENTS

| | | | |
|---|---|---|---|
| 5,047,867 A | 9/1991 | Strubbe et al. | 358/335 |
| 5,075,771 A | 12/1991 | Hashimoto | 358/84 |
| 5,189,630 A | 2/1993 | Barstow et al. | |
| 5,210,611 A | 5/1993 | Yee et al. | 358/191.1 |
| 5,223,924 A | 6/1993 | Strubbe | 358/86 |
| 5,317,403 A | 5/1994 | Keenan | 348/731 |
| 5,323,240 A | 6/1994 | Amano et al. | 348/731 |
| 5,347,632 A | 9/1994 | Filepp et al. | |
| 5,410,344 A | 4/1995 | Graves et al. | 348/1 |
| 5,432,561 A | 7/1995 | Strubbe | 348/565 |
| 5,444,499 A | 8/1995 | Saitoh | 348/734 |
| 5,446,919 A | 8/1995 | Wilkins | |
| 5,465,113 A | 11/1995 | Gilboy | 725/25 |
| 5,465,385 A | 11/1995 | Ohga et al. | 455/6.1 |
| 5,469,206 A | 11/1995 | Strubbe et al. | |
| 5,477,262 A | 12/1995 | Banker et al. | 348/7 |
| 5,481,296 A | 1/1996 | Cragun et al. | 348/13 |
| 5,483,278 A | 1/1996 | Strubbe et al. | 725/61 |
| 5,528,304 A * | 6/1996 | Cherrick et al. | 725/41 |
| 5,534,911 A | 7/1996 | Levitan | 348/1 |
| 5,589,892 A | 12/1996 | Knee et al. | 348/731 |
| 5,600,364 A | 2/1997 | Hendricks et al. | 348/1 |
| 5,617,565 A | 4/1997 | Augenbraum et al. | 395/604 |
| 5,621,456 A | 4/1997 | Florin et al. | 348/7 |
| 5,694,176 A | 12/1997 | Bruette et al. | 348/563 |
| 5,710,884 A | 1/1998 | Dedrick | |
| 5,717,923 A | 2/1998 | Dedrick | |
| 5,724,567 A | 3/1998 | Rose et al. | |
| 5,731,844 A | 3/1998 | Rauch et al. | 348/563 |
| 5,752,160 A | 5/1998 | Dunn | 455/5.1 |
| 5,758,257 A | 5/1998 | Herz et al. | |
| 5,774,357 A | 6/1998 | Hoffberg et al. | 364/188 |
| 5,781,246 A | 7/1998 | Alten et al. | 348/569 |
| 5,798,785 A | 8/1998 | Hendricks et al. | 725/1 |
| 5,801,747 A | 9/1998 | Bedard | 348/1 |
| 5,822,123 A | 10/1998 | Davis et al. | 348/564 |
| 5,848,396 A | 12/1998 | Gerace | 705/10 |
| 5,867,226 A | 2/1999 | Wehmeyer | 725/46 |
| 5,875,108 A | 2/1999 | Hoffberg et al. | 364/146 |
| 5,880,768 A | 3/1999 | Lemmons et al. | 348/1 |
| 5,903,545 A | 5/1999 | Sabourin et al. | 370/225 |
| 5,973,683 A * | 10/1999 | Cragun et al. | 345/327 |
| 5,977,964 A * | 11/1999 | Williams et al. | 345/327 |
| 6,005,597 A * | 12/1999 | Barrett et al. | 725/9 |
| 6,029,195 A * | 2/2000 | Herz | 709/219 |
| 6,075,526 A | 6/2000 | Rothmuller | 345/327 |
| 6,081,750 A | 6/2000 | Hoffberg et al. | 700/17 |
| 6,088,722 A | 7/2000 | Herz et al. | 709/217 |
| 6,104,705 A | 8/2000 | Ismail et al. | |
| 6,133,909 A | 10/2000 | Schein et al. | 345/327 |
| 6,163,316 A | 12/2000 | Killian | 345/327 |
| 6,172,674 B1 * | 1/2001 | Etheredge | 345/327 |
| 6,177,931 B1 | 1/2001 | Alexander et al. | 345/327 |
| 6,181,335 B1 | 1/2001 | Hendricks et al. | 345/328 |
| 6,216,264 B1 | 4/2001 | Maze et al. | 725/53 |
| 6,437,836 B1 | 8/2002 | Huang et al. | 348/734 |
| 6,505,348 B1 | 1/2003 | Knowles et al. | 725/49 |

FOREIGN PATENT DOCUMENTS

| | | |
|---|---|---|
| DE | 44 40 419 A1 | 5/1996 |
| EP | 0 774 866 A2 | 5/1997 |
| GB | 1 554 411 | 10/1979 |
| WO | WO 86/01359 | 2/1986 |
| WO | WO 89/03085 | 4/1989 |
| WO | WO 94/13107 | 6/1994 |
| WO | WO 95/28799 | 10/1995 |
| WO | WO 96/17467 A2 | 6/1996 |
| WO | WO 96/17473 | 6/1996 |
| WO | WO 96/41478 | 12/1996 |
| WO | WO 97/48230 A1 | 12/1997 |
| WO | WO 98/26584 | 6/1998 |
| WO | WO 98/48566 | 10/1998 |
| WO | WO 99/01984 | 1/1999 |
| WO | WO 99/45701 | 9/1999 |
| WO | WO 00/04708 | 1/2000 |
| WO | WO 00/05889 | 2/2000 |
| WO | WO 00/28734 | 5/2000 |
| WO | WO 99/14947 | 2/2002 |

* cited by examiner

80

PREFERENCE ATTRIBUTE

SERIES # 1

SERIES # 2

SERIES # 3

MOVIES

GAME SHOWS

NEWS

BASEBALL

COMEDY

JOHN WAYNE

ARNOLD SCHWARZENEGGER

*FIG. 3*

| PREFERENCE ATTRIBUTE | PREFERENCE LEVEL |
|---|---|
| COMEDY | STRONG LIKE |
| DISNEY CHANNEL | WEAK LIKE |
| HORROR | WEAK DISLIKE |
| ARNOLD SCHWARZENEGGER | STRONG DISLIKE |
| CLOSED-CAPTIONED | MANDATORY |
| R RATING | ILLEGAL |
| ENGLISH | MANDATORY |
| TV-MA RATING | ILLEGAL |
| NC-17 RATING | ILLEGAL |
| SCOPE = LIKES ONLY | |

| NARROW SCOPE | MODERATE SCOPE | WIDE SCOPE | TITLE | GENRE | CC | RATING | MANDATORY+ NOT ILLEGAL | HIGHEST LEVEL |
|---|---|---|---|---|---|---|---|---|
| Y | Y | Y | SEINFELD | COMEDY | Y | TV-PG | Y | SL |
| N | N | Y | THE SHINING | HORROR | Y | PG-13 | Y | WD |
| N | N | N | DANTE'S PEAK | COMEDY | Y | R | N | SL |
| N | N | N | NIGHT AT THE OPERA | COMEDY | N | G | N | SL |
| N | Y | Y | ER | DRAMA | Y | TV-PG | Y | NEUTRAL |
| N | N | Y | TERMINATOR | ACTION HORROR | Y | PG-13 | Y | SD |
| Y | Y | Y | MY STEPMOTHER IS AN ALIEN | COMEDY HORROR | Y | PG-13 | Y | SL+WD |

FIG. 9

PROFILE NO. 1

| | |
|---|---|
| SEINFELD | SL |
| COMEDY | SL |
| HORROR | SD |
| RERUNS | WD |
| "BOND" | SL |

SCOPE = NARROW

PROFILE NO. 2

| | |
|---|---|
| ESPN | WL |
| HOCKEY | SL |
| SAP | WL |
| COMEDY | WL |

SCOPE = MODERATE

PROFILE NO. 3

| | |
|---|---|
| CRITICS RATING ABOVE 3 ★ | SL |
| MOVIES | SL |
| SPORTS | SD |
| PAY-PER-VIEW | WL |

SCOPE = NARROW

| TIME | CH | TITLE |
|---|---|---|
| 9:00 PM | 4 | SEINFELD |
| 10:00 PM | 2 | DANTE'S PEAK |
| 10:00 PM | 7 | ER |

PROFILE ◁ MIKE ▷

SCOPE ◁ ONLY LIKES ▷

FIG. 19

| TIME | CH | TITLE |
|---|---|---|
| 10:00 PM | 4 | DANTE'S PEAK |
| 10:00PM | 5 | NEWS |
| 10:00PM | 7 | ER |

PRESS FAV

| TIME | CH | TITLE | | |
|------|----|----|---|---|
| 9:00 PM | 4 | SEINFELD | M | ⎫ RED |
| 10:00PM | 4 | DANTE'S PEAK | M | ⎭ |
| 10:00PM | 5 | NEWS — RED | | |
| 10:00PM | 7 | ER | J M | ⎫ GREEN |
| 10:00PM | 9 | FOOTBALL | J | ⎭ |

MASTER PROFILE

| R RATING | ILLEGAL |
| ENGLISH | MANDATORY |

PROFILE JOEY

| COMEDY | STRONG LIKE |
| R RATING | MANDATORY |
| ⋮ | ⋮ |

```
                    PROFILE
┌─────────────────────────────────────────┐
│ PROFILE NAME: MIKE                      │
│                                         │
│         PROGRAM SETTINGS                │
│  ┌──────────────┬────────────────────┐  │
│  │   COMEDY     │   STRONG LIKE      │  │
│  ├──────────────┼────────────────────┤  │
│  │   ENGLISH    │   MANDATORY        │  │
│  ├──────────────┼────────────────────┤  │
│  │      :       │        :           │  │
│  ├──────────────┴────────────────────┤  │
│  │  SCOPE = MODERATE                 │  │
│  └───────────────────────────────────┘  │
│                                         │
│         NON-PROGRAM SETTINGS            │
│  ┌────────────────────────────────┐     │
│  │                                │     │
│  │   AUDIO                        │     │
│  │   DOLBY    ON◁▷OFF             │◀─268│
│  │   STEREO   ON◁▷OFF             │     │
│  │      :                         │     │
│  │                                │     │
│  │   DISPLAY                      │     │
│  │   BRIGHTNESS       ◁HIGH  ▷    │◀─270│
│  │   TEXT LANGUAGE    ◁FRENCH▷    │     │
│  │          :                     │     │
│  │        :                       │     │
│  │         :                      │     │
│  │                                │     │
│  └────────────────────────────────┘     │
└─────────────────────────────────────────┘
```

PROGRAM GUIDE SYSTEM WITH PREFERENCE PROFILES

BACKGROUND OF THE INVENTION

This invention relates to interactive television program guides, and more particularly, to television program guides in which users may create profiles of their programming preferences. Profiles contain information about the user's interests (e.g., favored or disfavored programming genres, actors, channels, series, etc.) The profiles are used by the program guide in determining which channels the user may tune to and which programs are to be included in various lists displayed by the guide.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by genre (e.g., movies, sports, etc.) or by title (i.e, alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Because there are so many television channels available, particularly with cable and satellite television systems, television program guides have been developed that allow users to establish lists of favorite channels. When a user is channel surfing, the set top box on which the program guide is implemented can be directed to tune only to channels contained in the favorite channel list. When the user directs the program guide to display current or future programming, the displayed list of programs is restricted to television programs that occur only on the user's preselected favorite channels.

This approach is not very selective. Even though a user may have chosen a channel as a favorite, some of the programming that appears on that channel may not be of interest to the user. Moreover, programs that would be of interest to the user often appear on channels that the user has not chosen as favorites (e.g., because the user does not like most of the programming on those channels).

What is needed is a more sophisticated way in which a user may inform a program guide of the user's preferences, so that the program guide can more accurately filter out disliked programming while retaining more programming of the type the user likes.

It is therefore an object of the present invention to provide a program guide system with which a user may set up a profile based on various preference attributes.

SUMMARY OF THE INVENTION

These and other objects of the invention are accomplished in accordance with the principles of the present invention by providing an interactive television program guide system in which a user may inform a program guide of the user's television programming interests. The user may specify a number of preference attributes such as program title, genre, start time, broadcast characteristics, language, rating, critics ratings, actor, etc. Each preference attribute has an associated preference level that is indicative of the user's interest in that attribute. Suitable preference levels include: strong like, weak like, strong dislike, weak dislike, illegal, mandatory, and don't care.

The program guide may maintain the preference attributes and associated preference levels for a user in a preference profile. Different preference profiles may be used by different users of the same program guide. If desired, more than one preference profile may be active at a given time.

The program guide may use the preference profiles when displaying lists of available television programming. Only those programs that satisfy the preference profile will be displayed by the program guide, even if other programs are available. Another way in which the program guide may use the preference profiles is to restrict the programs to which the user may tune with the system to only those programs that satisfy the profile.

A user may define a preferred sort order for programs that satisfy the profile. The user may also specify a desired preference scope. A narrow scope may be used to restrict programming choices to programs that are liked, whereas a wide scope may be used to restrict programming choices to programs that are just not disliked.

The user may direct the program guide to require a personal identification number (PIN) in order to access certain profile modification options. Such personal identification number access control may be used by parents to control the television viewing of their children.

A master profile may be used that has settings that override the settings in other profiles.

Profiles may contain non-program settings for controlling audio and display options in the system.

Further features of the invention, its nature and various advantages will be more apparent from the accompanying drawings and the following detailed description of the preferred embodiments.

BRIEF DESCRIPTION OF THE DRAWINGS

FIG. 3 is a diagram of an illustrative preference profile showing how multiple preference attributes of the same type may be associated with the same preference profile.

FIG. 7 is a diagram of an illustrative preference profile containing multiple preference attributes and their associated preference levels and an associated preference scope in accordance with the present invention.

FIG. 8 is a table illustrating the titles, genres, closed-caption status, and ratings associated with a number of programs and illustrating which groups of these programs would satisfy the profile of FIG. 7 with various different preference scopes in accordance with the present invention.

FIG. 9 is a diagram illustrating how multiple profiles may be used and how a given preference attribute may be associated with more than one such profile in accordance with the present invention.

FIG. 19 is an illustrative by-time favorites list display in accordance with the present invention.

FIG. 22 is a diagram of a program listings screen illustrating the restricted highlight movement mode in accordance with the present invention.

FIG. 24 is an illustrative program listings screen showing how programs that satisfy different preference profiles can be listed with different colors, patterns, or icons in accordance with the present invention.

FIG. 29 is a diagram illustrating the concurrent use of both a master profile and another profile in accordance with the present invention.

FIG. 31 is a diagram illustrating how both program settings and non-program settings may be associated with a given preference profile in accordance with the present invention.

DETAILED DESCRIPTION OF THE PREFERRED EMBODIMENTS

Figure 1:
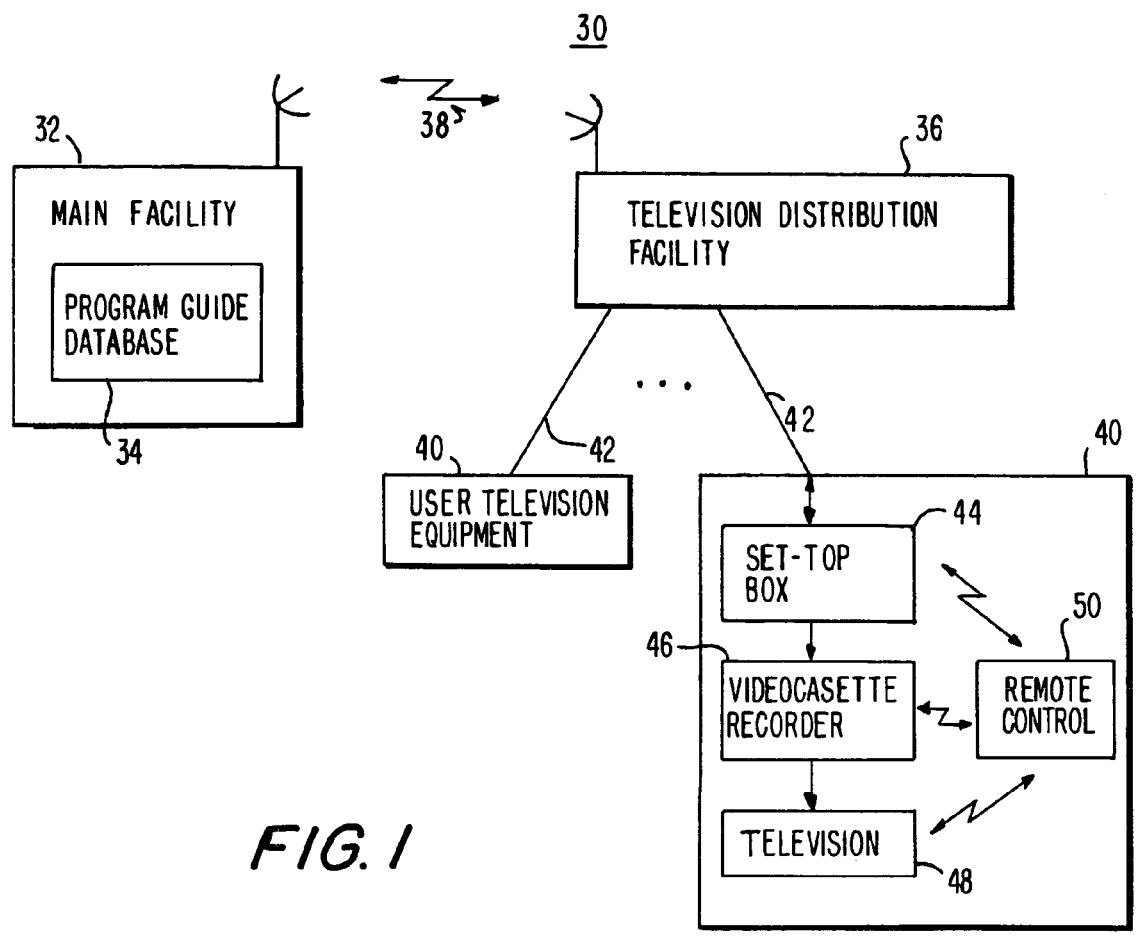
FIG. 1 is a diagram of a system in which an interactive television program guide is implemented in accordance with the present invention.

An illustrative program guide system 30 in accordance with the present invention is shown in FIG. 1. Main facility 32 contains a program guide database 34 for storing program guide information such as television program guide listings data, pay-per-view ordering information, television program promotional information, etc. Information from database 34 may be transmitted to television distribution facility 36 via communications link 38. Link 38 may be a satellite link, a telephone network link, a cable or fiber optic link, a microwave link, a combination of such links, or any other suitable communications path. If it is desired to transmit video signals over link 38 in addition to data signals a relatively high bandwidth link such as a satellite link is generally preferable to a relatively low bandwidth link such as a telephone line.

Television distribution facility 36 is a facility for distributing television signals to users, such as a cable system headend, a broadcast distribution facility, or a satellite television distribution facility.

The program guide information transmitted by main facility 32 to television distribution facility 36 includes television program listings data for current and future television programs. The television program listings data for each program preferably includes the title of the program, the channel for the program, a scheduled broadcast time (start time) and an ending time (or duration). Other typical program listings data include ratings, critics ratings, descriptions, genres (sports, movies, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Television distribution facility 36 distributes television programming and program guide information to the user television equipment 40 of multiple users via communications paths 42. For example, television programming may be distributed over analog television channels and program guide data may be distributed over an out-of-band channel on paths 42. Data distribution may also involve using one or more digital channels on paths 42. Such digital channels may also be used for distributing television programming and other information. Multiple television and audio channels (analog, digital, or both analog and digital) may be provided to set-top boxes 44 via communications paths 42. If desired, program listings and other information may be distributed by one or more distribution facilities that are similar to but separate from television distribution facility 36 using communications paths that are separate from communications paths 42.

Certain functions such as pay program purchasing may require set-top boxes 44 to transmit data to television distribution facility 36 over communications paths 42. If desired, such data may be transmitted over telephone lines or other separate communications paths. If functions such as these are provided using facilities separate from television distribution facility 36, some of the communications involving set-top boxes 44 may be made directly with the separate facilities.

Each user has a receiver, which is typically a set-top box such as set-top box 44, but which may be other suitable television equipment into which circuitry similar to set-top-box circuitry has been integrated. Program guide data is distributed to set-top boxes 44 periodically. Television distribution facility 36 may also poll set-top boxes 44 periodically for certain information (e.g., pay program account information or information regarding programs that have been purchased and viewed using locally-generated authorization techniques). Main facility 32 preferably contains a processor to handle information distribution tasks. Each set-top box 44 preferably contains a processor to handle tasks associated with implementing a program guide application on the set-top box 44. Television distribution facility 36 may contain a processor for tasks associated with monitoring a user's interactions with the interactive program guide implemented on set-top boxes 44 and for handling tasks associated with the distribution of program guide data and other information to user television equipment 40.

Each set-top box 44 is typically connected to an optional videocassette recorder 46 so that selected television programs may be recorded. Each videocassette recorder 46 is connected to a television 48. To record a program, set-top box 44 tunes to a particular channel and sends control signals to videocassette recorder 46 (e.g., using an infrared transmitter) that direct videocassette recorder 46 to start and stop recording at the appropriate times.

During use of the interactive television program guide implemented on set-top box 44, television program listings and other information may be displayed on television 48. Such program guide displays may be presented on top of a television program to which the user has tuned with set-top box 44 or may be presented in place of such a program. Each set-top box 44, videocassette recorder 46, and television 48 may be controlled by one or more remote controls 50 or any other suitable user input interface such as a wireless keyboard, mouse, trackball, dedicated set of buttons, etc. Remote controls such as remote control 50 have various buttons that may be pressed by the user such as cursor keys (for on-screen movement of a highlight region, scrolling functions, etc.), an enter key (for making a selection), channel number keys (for selecting a television channel), a favorites key (to invoke functions related to user preferences), etc.

Because television viewers sometimes feel overwhelmed by the large number of programming choices that are available, particularly with modern cable and satellite systems, the present invention allows users to inform the program guide of their programming preferences. The program guide may then tailor its operation to reflect the user's programming interests.

For example, a user may inform the program guide that the user likes the program Seinfeld and the programming genre "movies," but dislikes the actor John Wayne. The program guide can use these preferences to limit the amount of material that is presented to the user (e.g., when generating lists of television program choices or when deciding which channels to allow the user to tune to with the set-top box). The different types of television program characteristics that a user may indicate a preference about are referred to herein as preference attributes.

Each preference attribute may have an associated preference level. For example, users may indicate whether a preference attribute is liked, disliked, illegal, mandatory or don't care (neutral). The degree to which a user likes or dislikes certain preference attributes may also be specified. For example, the user may indicate that the preference level associated with the preference attribute of the genre sports is a strong like and that the preference level associated with the preference attribute of the actor John Wayne is a weak dislike.

The program guide implemented on set-top box 44 provides various options that allow the user to specify which different preference attributes are to be used in presenting television program listings information to the user. Such options may be provided in the form of clickable menu items, drop-down lists, or any other suitable format. The user may select a desired menu item using a highlight region, cursor, arrow, or other suitable on-screen indicator that may be positioned over an option on the display (i.e., television 48). For example, a user may position a highlight region over a desired menu item and press "OK" on remote control 50 to complete the selection. Selections that involve entering characters may be made by selecting characters from characters displayed on screen (e.g., using cursors to move through the alphabet) or by using a wireless keyboard or other alphanumeric entry device.

Figure 2A:
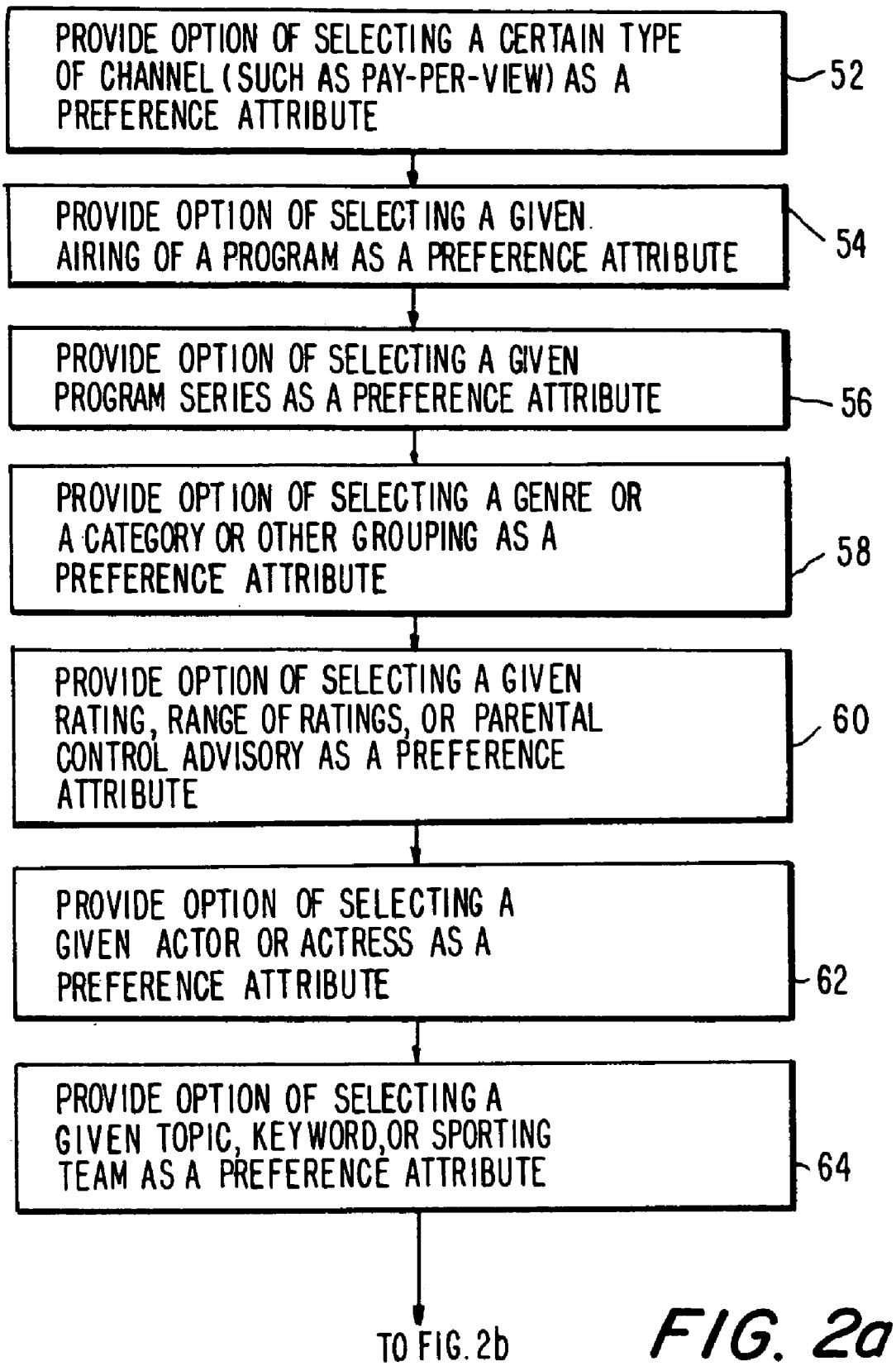
FIGS. 2a and 2b are flow charts of steps involved in providing options for selecting various preference profile attributes in accordance with the present invention.
Figure 2B:
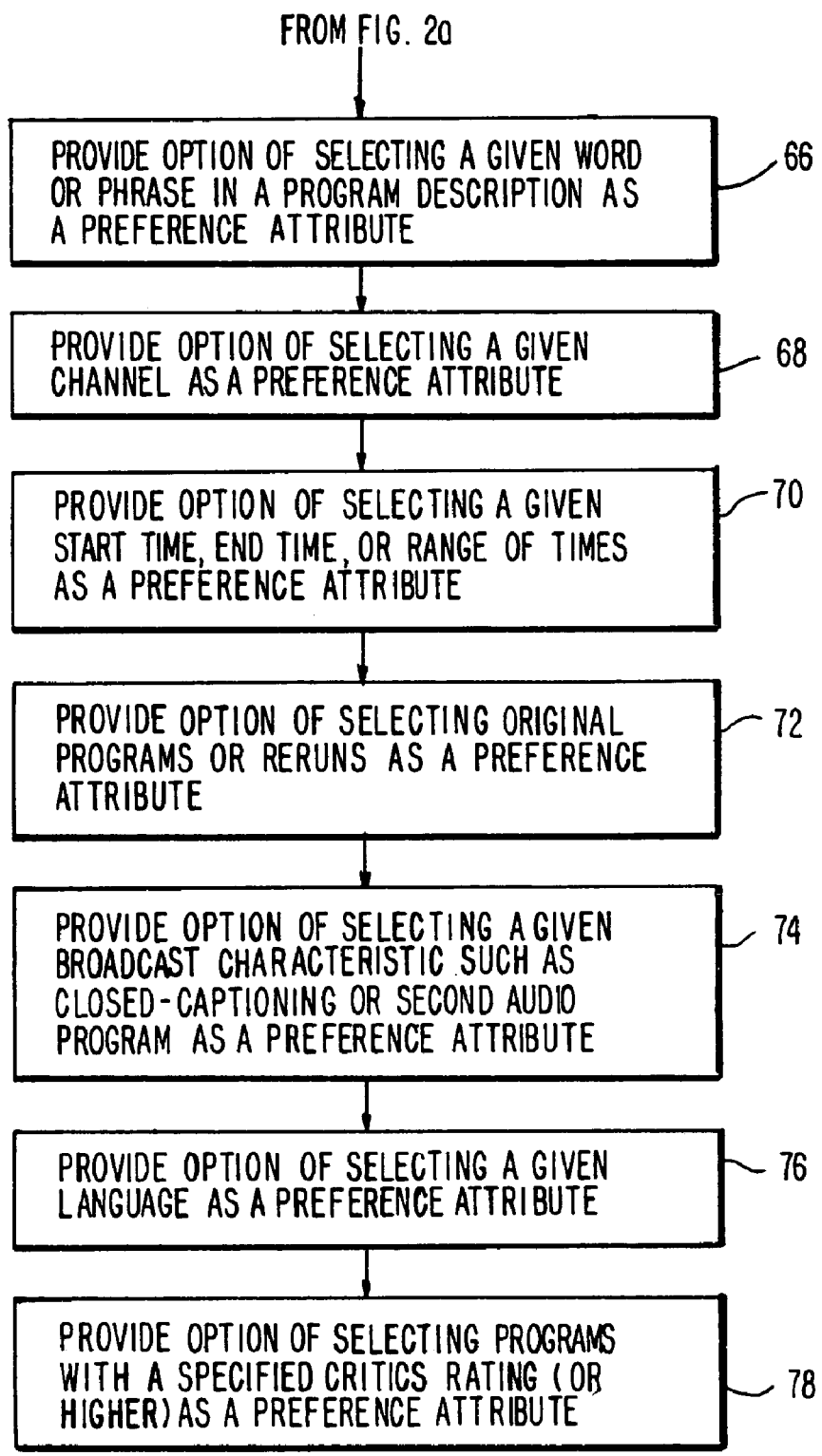

Steps that are involved in providing preference attribute options with the program guide are shown in FIGS. 2*a* and 2*b*. At step 52 of FIG. 2*a*, the program guide may provide the user with the option of selecting a certain type of channel (such as the pay-per-view channel type) as a preference attribute. This feature allows a user to express an interest in, e.g., pay-per-view programming without requiring the user to individually select or even know the names of all of the pay-per-view channels that are available.

At step 54, the program guide may provide the user with the option of selecting a given airing of a program as a preference attribute. For example, if the user wishes to watch the next broadcast of the program Seinfeld at 9:00 on Thursday, the user may select that broadcast of Seinfeld as a preference attribute and may indicate that the selection has a preference level of "strong like." This effectively allows the user to use the indicated preference as a reminder (e.g., in situations in which the program guide has been configured to present an on-screen reminder of all upcoming programs that satisfy the user's selected preferences).

At step 56, the program guide may provide the user with the option of selecting a given program series as a preference attribute. For example, the user could indicate an interest in the Seinfeld series. When the user directs the program guide to present a list of available programs, the programs that are listed will include those in the Seinfeld series (unless a conflicting preference prevents such a program from being listed).

At step 58, the program guide may provide the user with the option of selecting as a preference attribute a program genre (category) or other suitable grouping (e.g., all programs aired on Sundays, etc.—that are not in a traditional genre, but that are in some way related). For example, the genre (which may be a subgenre) may be sports, children's programming, news, weather, movies, action, horror, baseball, football, comedy, etc.

At step 60, the program guide may provide the user with the option of selecting a rating (G, PG, TV-Y, etc.), a range of ratings (e.g., the R rating and all ratings for more mature audiences), or a parental control advisory (e.g., this program contains strong language, etc.) as a preference attribute.

At step 62, the program guide may provide the user with the option of selecting an actor or actress as a preference attribute.

At step 64, the program guide may provide the user with the option of selecting a topic (e.g., cooking, photography, music, painting), keyword (e.g., cooks, etc.), or sporting team as a preference attribute.

As shown in FIG. 2b, at step 66 the program guide may provide the user with the option of selecting a given word or phrase in a program description as a preference attribute. The program guide may search all program descriptions for the presence of the selected word or phrase when determining whether a program satisfies the user's preference criteria.

At step 68, the program guide may provide the user with the option of selecting a channel as a preference attribute.

At step 70, the program guide may provide the user with the option of selecting a start time (e.g., a scheduled broadcast time), an end time, or a range of broadcast times as a preference attribute. This feature may be used for parental control by restricting the viewing times available for children.

At step 72, the program guide may provide the user with the option of selecting original (or rerun) programs as a preference attribute.

At step 74, the program guide may provide the user with the option of selecting a given broadcast characteristic such as closed-captioning or secondary audio as a preference attribute.

At step 76, the program guide may provide the user with the option of selecting a language as a preference attribute.

At step 78, the program guide may provide the user with the option of selecting a certain critics rating (e.g., three stars, or three stars or greater, etc.) as a preference attribute.

The steps involved in providing the preference attribute selection options shown in FIGS. 2a and 2b are illustrative only and the program guide may provide the user with the option of selecting any other suitable preference attributes if desired. Moreover, the order of the steps shown in FIGS. 2a and 2b is not important. Typically, several such options are provided at the same time (e.g., on the same menu screen).

The preference attributes the user selects may be organized in a profile (sometimes called a preference profile or a favorites profile). If there are several users (e.g., different family members) associated with a given program guide, each user may have his own profile. A profile may contain more than one preference attribute of the same type. For example, preference profile 80 of FIG. 3 has three series preference attributes (series Nos. 1, 2, and 3), four genre preference attributes (movies, game shows, news, baseball, and comedy), and two actor preference attributes (John Wayne and Arnold Schwarzenegger).

If desired, the user may specify a priority or sort order in which programs satisfying the preference criteria in a profile are to be displayed or tuned to. When listing or tuning to programs that satisfy a profile, the programs matching the highest priority preference attributes may be tuned to (with set-top box 44) or listed (on the display of television 48) first. This feature is particularly useful when a user wishes to further simplify the process of selecting programs of interest.

Figure 4:
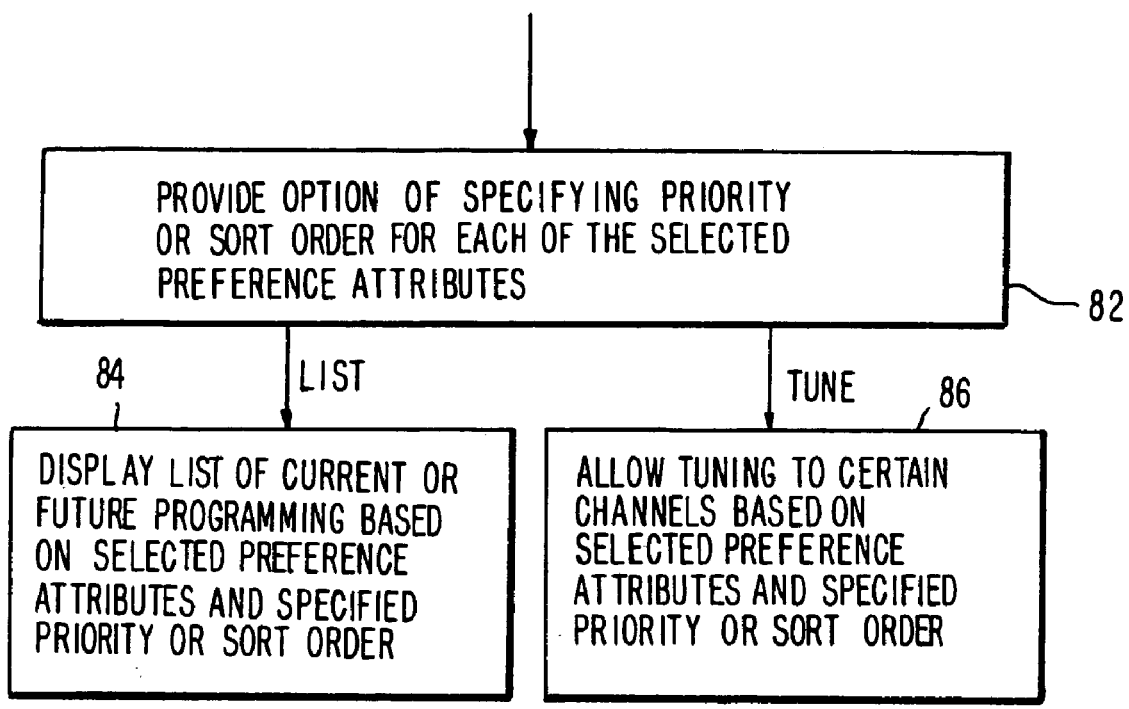
FIG. 4 is a flow chart showing steps involved in using the program guide with a specified sort order in accordance with the present invention.

FIG. 4 shows how the program guide provides the user with the option of specifying the sort order (i.e., priority) for each of the selected preference attributes at step 82. If the user chooses to list programs satisfying the profile criteria, the program guide may display a list of the current or future programs based on the selected preference attributes and the specified sort order at step 84. If the user chooses to use the profile to limit the channels that may be tuned to, rather than displaying a list of results, the program guide may allow tuning to channels and programs based on the selected preference attributes in the profile and the specified sort order at step 86.

Figure 5:
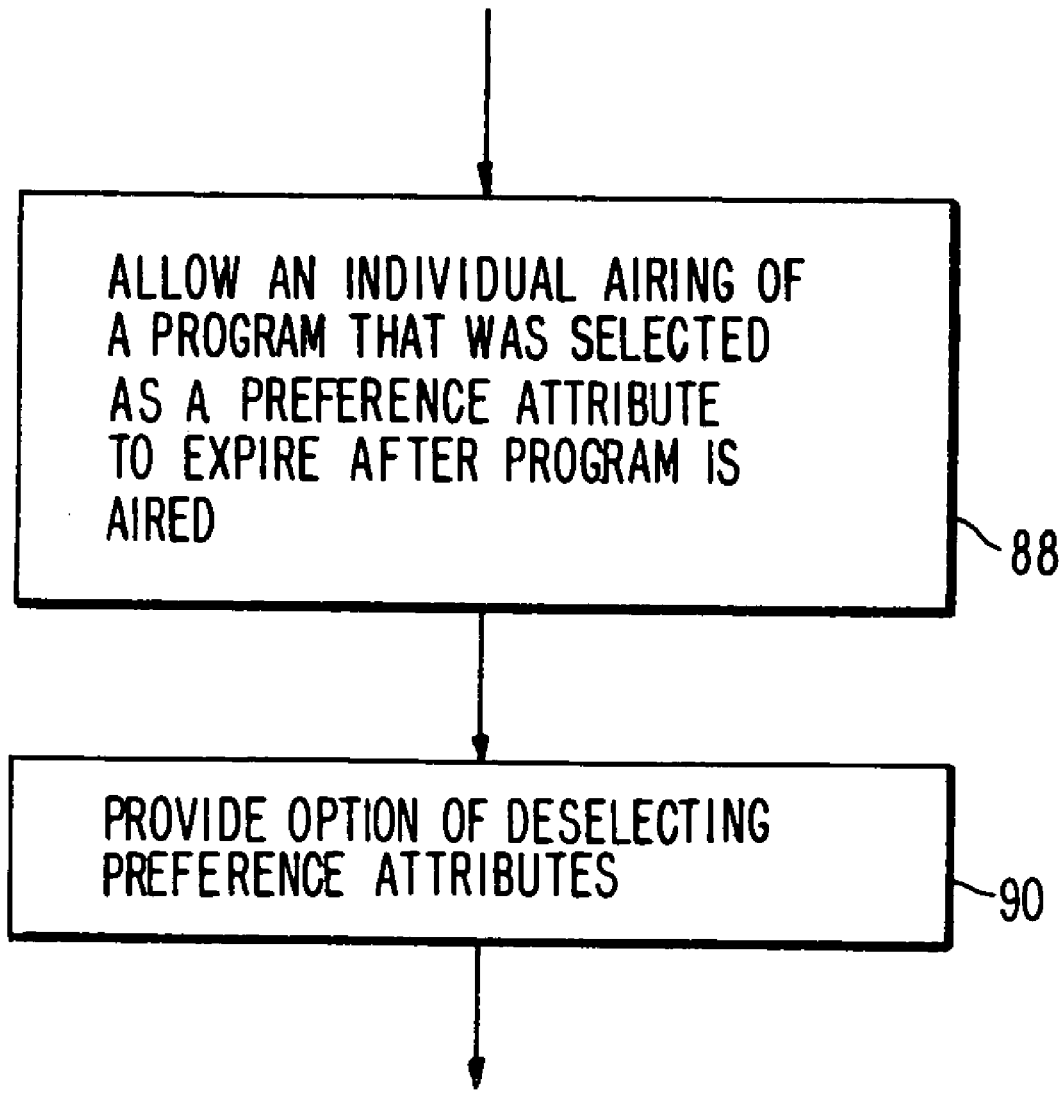
FIG. 5 is a flow chart of steps involved in allowing a selected preference attribute to expire or be deselected in accordance with the present invention.

When a user selects an individual showing of a program as part of a preference profile, the program guide will allow that selection to expire at the end of the program. This is shown as step 88 in FIG. 5. The program guide may allow preference attributes that have been selected by the user to remain valid until deselected by the user (step 90).

Figure 6:
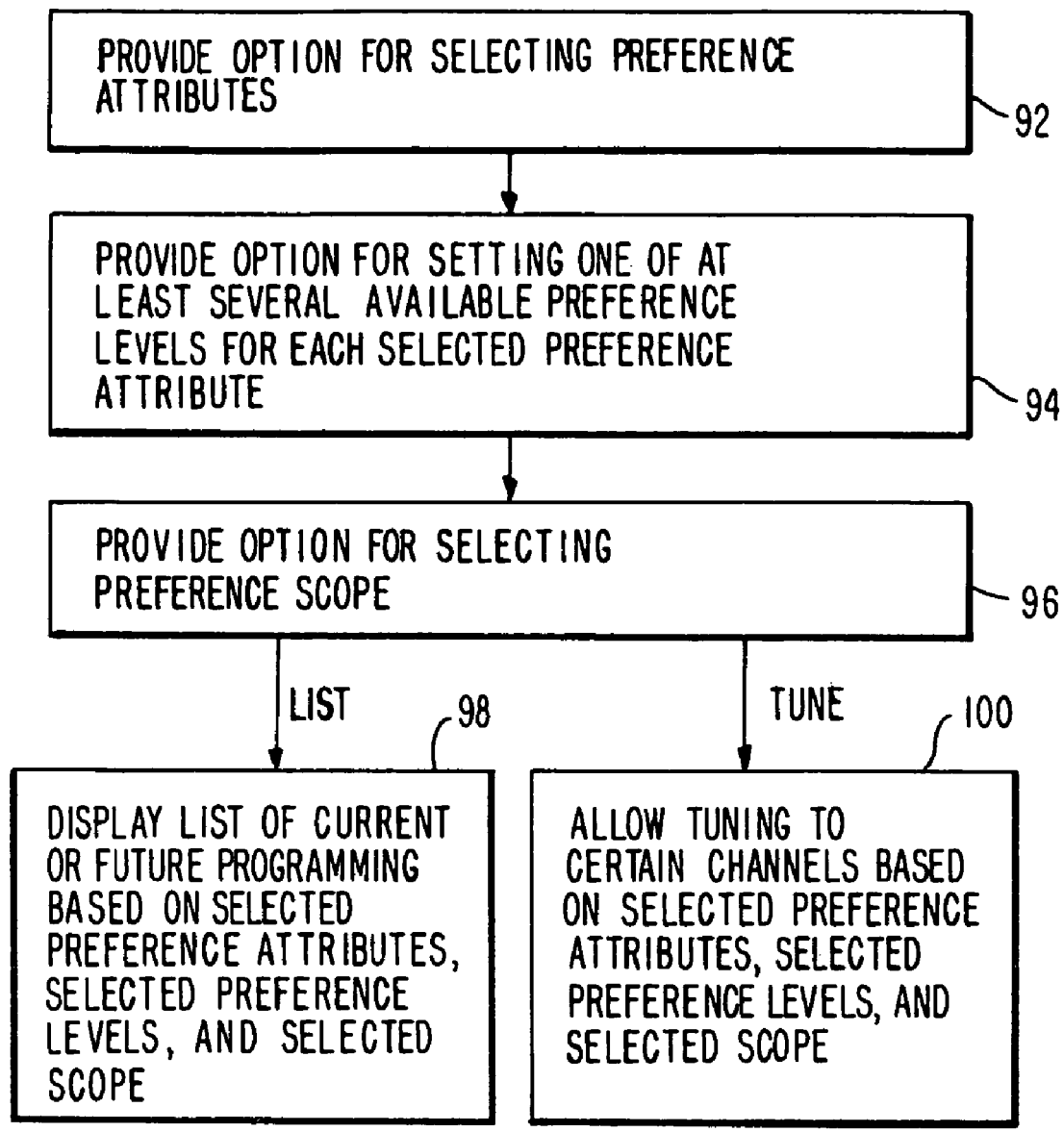
FIG. 6 is a flow chart of steps involved in using the program guide with various preference scopes in accordance with the present invention.

Preference levels that may be used to indicate the user's interest or disinterest in a given preference attribute include strong like, weak like, strong dislike, or weak dislike, mandatory (appropriate, e.g., for closed-captioning for a deaf person), illegal (appropriate for R-rated programs for a child) and don't care (neutral). As shown in FIG. 6, after the program guide provides the user with an opportunity (option) for selecting preference attributes at step 92, the program guide provides an option that allows the user to set one of at least several available preference levels for each selected preference attribute at step 94.

The program guide also allows the user to specify a preference scope at step 96. Each profile may have a separate associated preference scope. The preference scope is used to determine which programs that match the preference criteria in the profile will be displayed (or used when tuning). If the user opts to display a list of programs based on a preference profile, the program guide may display a list of current or future programming based on the selected preference attributes, selected preference levels, and preference scope that are associated with the profile at step 98. If the user opts to have the program guide restrict the user's tuning options based on the preference profile, the program guide may allow tuning to certain channels or programs based on the selected preference attributes, selected preference levels, and the selected preference scope that are associated with the profile at step 100. The program listings information that is used by the program guide in displaying the list of programs or in controlling the tuning of the set-top box is the program listings data provided to the program guide by the television distribution facility.

An illustrative preference profile 102 containing a number of preference attributes 104, associated preference levels 106, and an associated preference scope 108 is shown in FIG. 7. FIG. 8 is a table containing an illustrative list of programs that might be available to the user (under the title column). The results that appear under the columns labeled "narrow scope," "moderate scope," and "wide scope" show which programs (from the titles column) satisfy the preference attributes and preference levels of profile 102 (FIG. 7).

When the user selects the widest scope in the example of FIG. 8, the program guide lists (or allows tuning to) programs that have all mandatory attributes and no illegal attributes. For example, Seinfeld is included in the widest preference scope because Seinfeld has the only mandatory attribute that is specified in profile 102 of FIG. 7—closed-captioning. In addition, Seinfeld has no preference attributes with a preference level of illegal (R rating, TV-MA rating, or NC-17 rating). The Night at the Opera is not included because it does not have a mandatory attribute (closed-captioning). Dante's Peak is not included because it has a illegal rating (R).

When the user selects the moderate scope in the example of FIG. 8, the program guide lists (or allows tuning to) programs that have no preference attributes with an associated preference level of disliked and that have all mandatory attributes and no illegal attributes. The program Terminator is not within the moderate scope example of FIG. 8 because the preference attribute of horror in profile 102 of FIG. 7 has an associated preference level of "weak dislike" and the preference attribute of Schwarzenegger (an actor in the program Terminator) has an associated preference level of "strong dislike." When faced with two different preference levels associated with the same program, the program guide uses the stronger of the two (in this case "strong dislike"). The program ER is included within the moderate scope example of FIG. 8 because it does not have any disliked attributes.

When the user selects the narrow preference scope in the example of FIG. 8, the program guide lists (or allows tuning to) all liked programs that are not more disliked and that have all mandatory attributes and no illegal attributes. The program ER is not within the narrow scope example, because it does not have any liked attributes.

The program guide allows multiple profiles to be used. For example, different users (e.g., different family members who share user television equipment 40) may each have their own profile. One profile may be used for children. Another profile may be used for children when watching television with their parents (who can supervise). A profile may be created for each adult. Another profile may be created for adults to use when watching television together.

An illustrative set of profiles is shown in FIG. 9. Profile No. 1 belongs to a first user who has a strong like for the program Seinfeld, a strong like for the genre comedy, a strong dislike for the genre horror, a weak dislike for reruns, and a strong like for programs containing the text string "Bond." The first user has selected a narrow preference scope. Profile No. 2 belongs to a second user who has a weak like for the ESPN channel, a strong like for the genre hockey, a weak like for the broadcast characteristic second audio program (SAP), and a weak like for comedy. The second user has selected a moderate preference scope. Profile No. 3 belongs to a third user who has a strong like for programs with a critics rating of three stars or more, a strong like for the genre movies, a strong dislike for the genre sports, and a weak like for pay-per-view programs. The third user has selected a preference scope of narrow.

Although each profile has its own independent set of preference attributes, any given attribute may be in more than one profile. For example, the attribute comedy appears in both profile No. 1 and profile No. 2.

Figure 10:
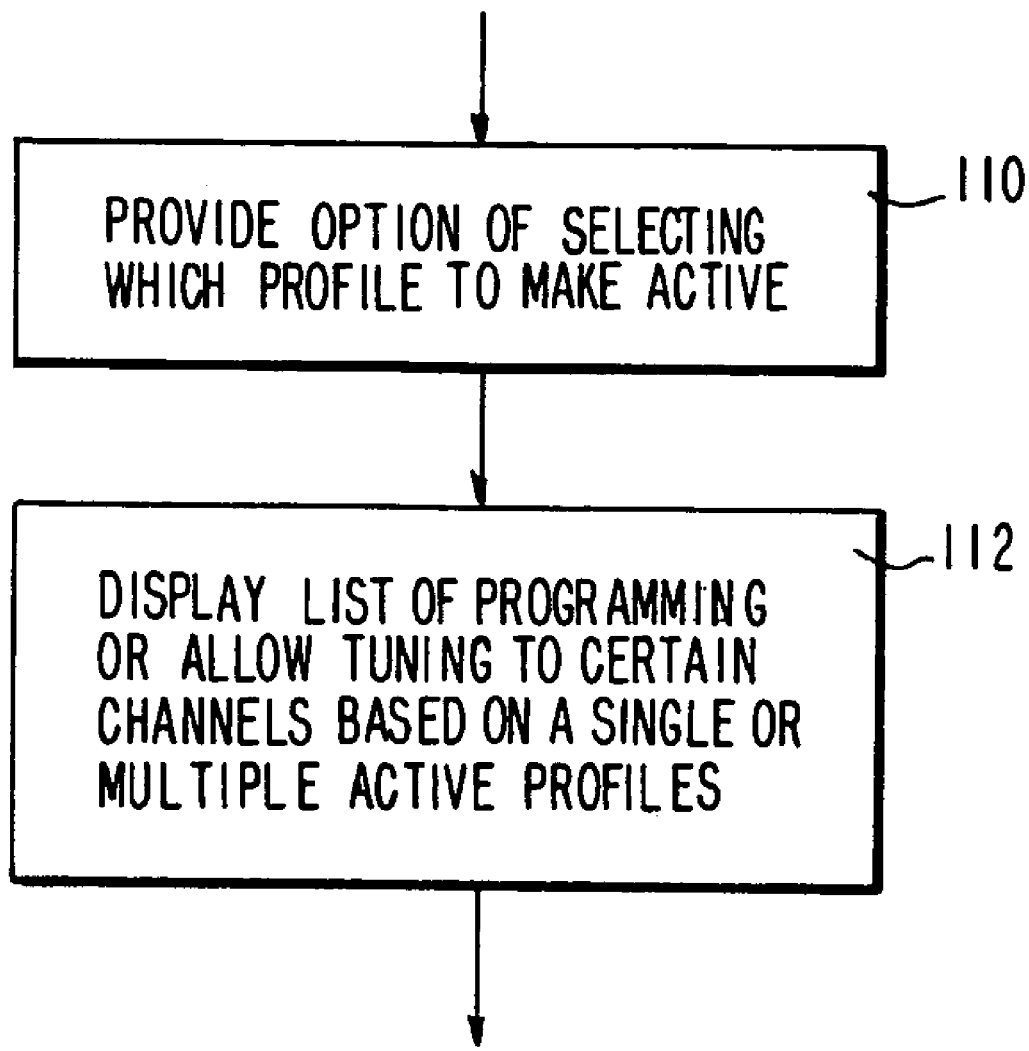
FIG. 10 is a flow chart of steps involved in selecting a profile to make active and displaying programming or allowing tuning based on one or more active profiles in accordance with the present invention.

When a user desires to use the program guide, the user may activate an appropriate profile. As shown in FIG. 10, the program guide provides users with the option of selecting which profile to make active at step 110. More than one profile may be active at a given time. If a single profile is made active at step 110, the program guide displays lists of programming or allows tuning to certain channels or programs based on that single active profile at step 112. If multiple profiles are made active at step 110, the program guide displays lists of programing or allows tuning to certain channels or programs based on the multiple profiles that are active at step 112.

When multiple profiles are used at the same time, the program guide resolves conflicts between profiles. For example, if one profile indicates that comedy is a strong like and another indicates that comedy is a strong dislike, the program guide may use a preference level of neutral for the attribute comedy. Conflicts between the scopes selected in different profiles may be resolved, for example, by using a moderate scope for all situations in which multiple profiles are active. These techniques for allowing multiple profiles to be active at the same time are illustrative only. Any other suitable technique may be used if desired.

Figure 11:
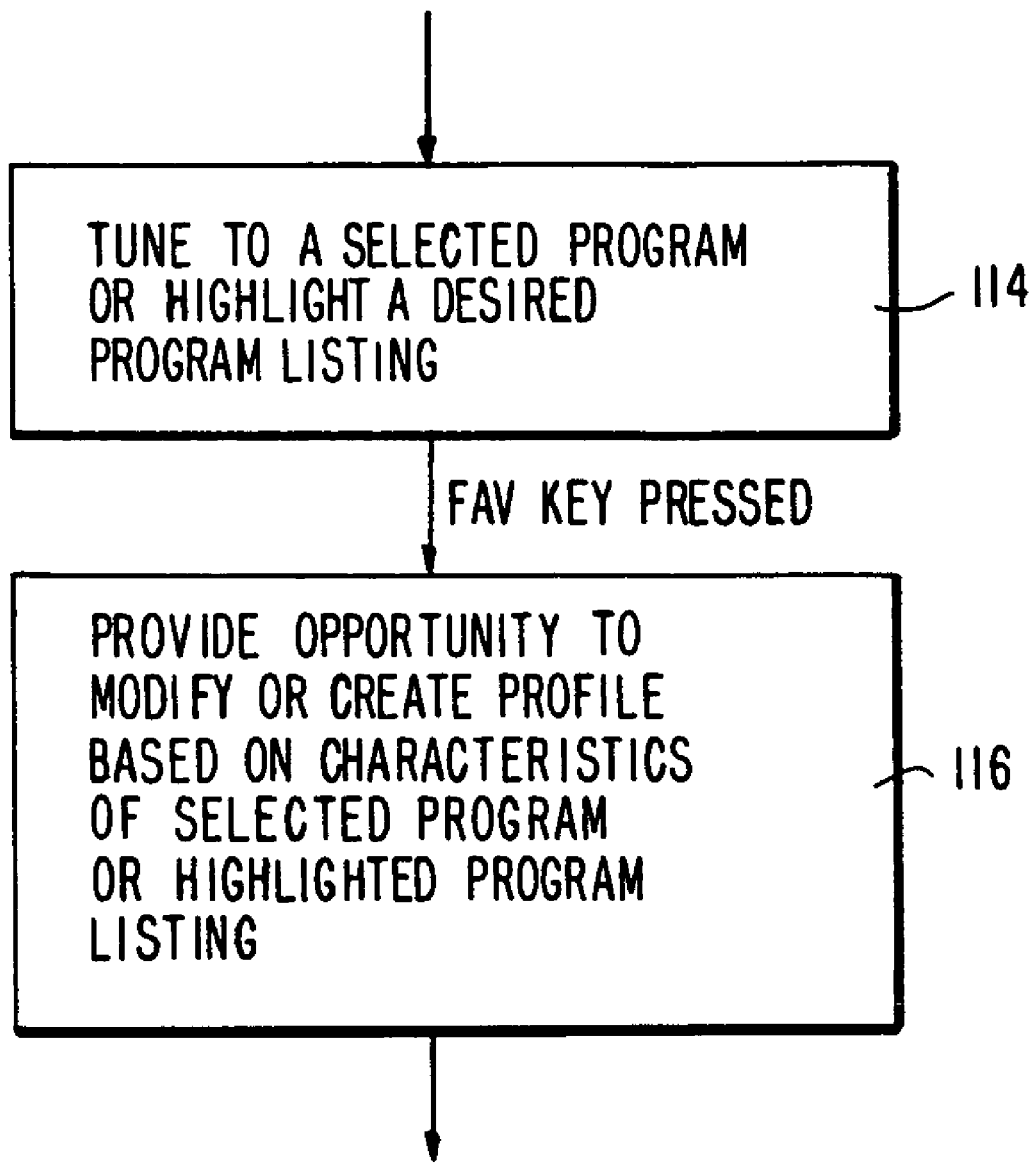
FIG. 11 is a flow chart illustrating how the program guide provides an opportunity to modify a profile based on the characteristics of a selected program in accordance with the present invention.

Preference attributes may be added to a profile by example. This is illustrated in FIG. 11. At step 114, the user may tune set-top box 44 to a channel (e.g., channel 9) to watch a desired television program (e.g., the program Seinfeld) or may highlight a desired program listing on any suitable program listings screen. The user may then press an appropriate button on the remote control (e.g., a "FAV" or favorites key) or may click on an on-screen option. The program guide then provides an opportunity to modify or create a profile based on the characteristics of the selected program or the highlighted program listing at step 116.

Figure 12:
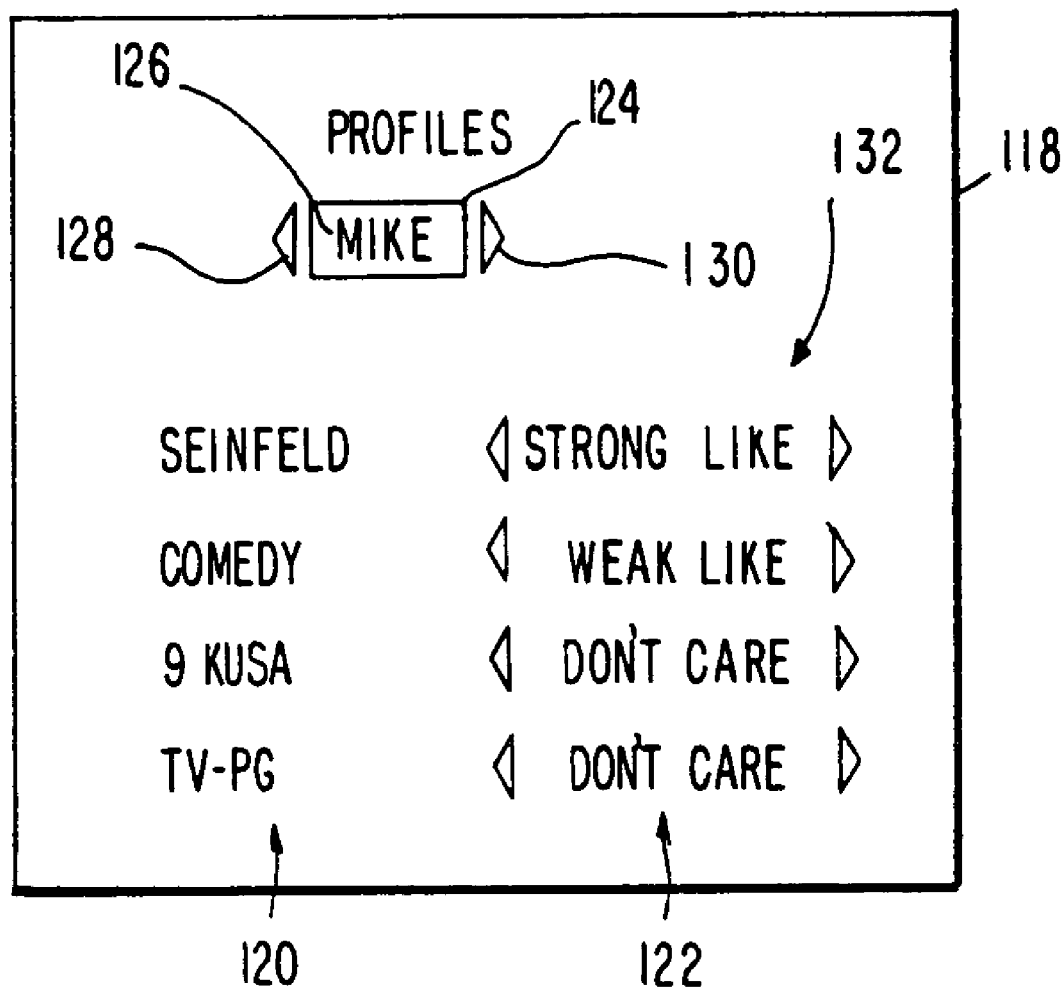
FIG. 12 is a diagram of an illustrative profiles display in accordance with the present invention.

For example, as shown in FIG. 12, the program guide may present a profiles display such as profiles display 118 in which all attributes of the selected program or highlighted program listing (Seinfeld) are listed in column 120 and the associated preference levels are listed in column 122. The user may select which profile to change or update when highlight region 124 is on a profile name 126 such as "Mike." As indicated by arrows 128 and 130, when the user presses left or right cursor keys on the remote control, the profile names for other users will be displayed under highlight region 124. By pressing a down cursor key, highlight region 124 may be moved to preference level selection region 132, where the user may use the right and left cursor keys to set the desired preference level (e.g., strong or weak like or dislike, don't care or neutral, illegal, or mandatory) for the program Seinfeld. The preference levels in column 122 may be modified similarly for each of the other attributes listed in column 120. The neutral preference level "don't care" may be set as a default. If desired, a previously selected attribute may be deselected from the profile. A new profile may be created by copying an existing profile and modifying its contents.

Figure 13:
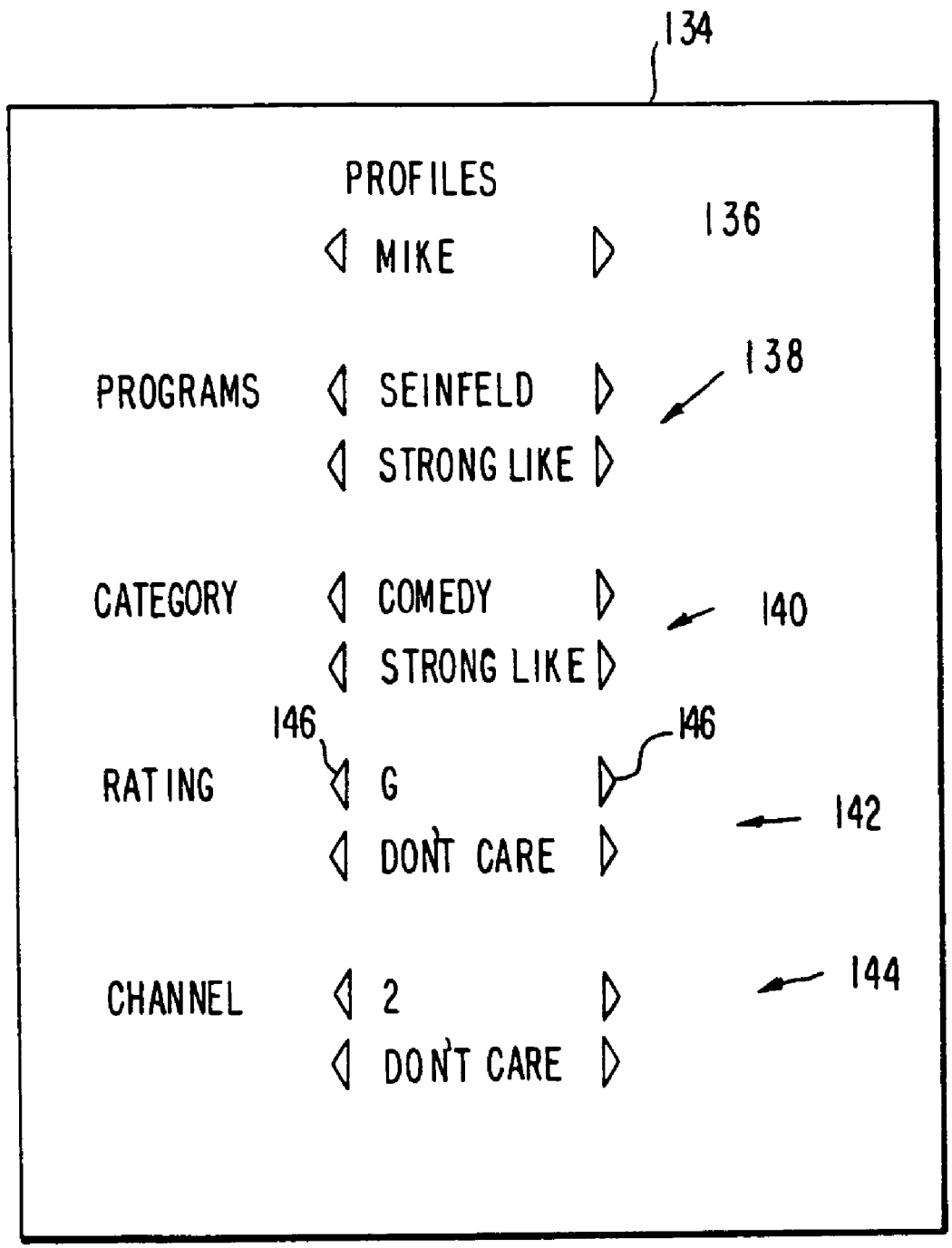
FIG. 13 is a diagram of another illustrative profiles display in accordance with the present invention.

Another way in which profiles may be modified is shown in FIG. 13. Profiles display 134 of FIG. 13 allows the user to view all selected attributes for a given profile. The program guide provides option 136 to allow the user to select which profile the user wishes to modify (e.g., "Mike" in the example of FIG. 13). Option 138 allows the user to set preference levels for various programs. Option 140 allows the user to set preference levels for various categories. Option 142 allows the user to set preference levels for various ratings. Option 144 allows the user to set preference levels for various channels. The options shown in profiles display 134 are illustrative only. Options may for provided for setting the preference levels of any desired preference attributes. The format of the options shown in FIG. 13 is also only illustrative.

Other user interfaces may be used by the program guide if desired. For example, it may be preferable to select ratings from a list (i.e., using arrows 146 in option 142 to select from among various available ratings choices). In option 138, the program guide may allow the user to enter the first few characters of a desired title. The program guide may then present a list of available titles that start with those letters. When the list has been narrowed sufficiently, the user may select the desired program title from the list. The program guide may allow text to be entered letter by letter using the cursor keys on the remote to change each letter, using a wireless keyboard, using the numeric keys on the remote to enter letters corresponding to a telephone keypad, etc. If desired, the program guide may allow users to remove attributes from the profile being modified using profiles display 134.

Figure 14:
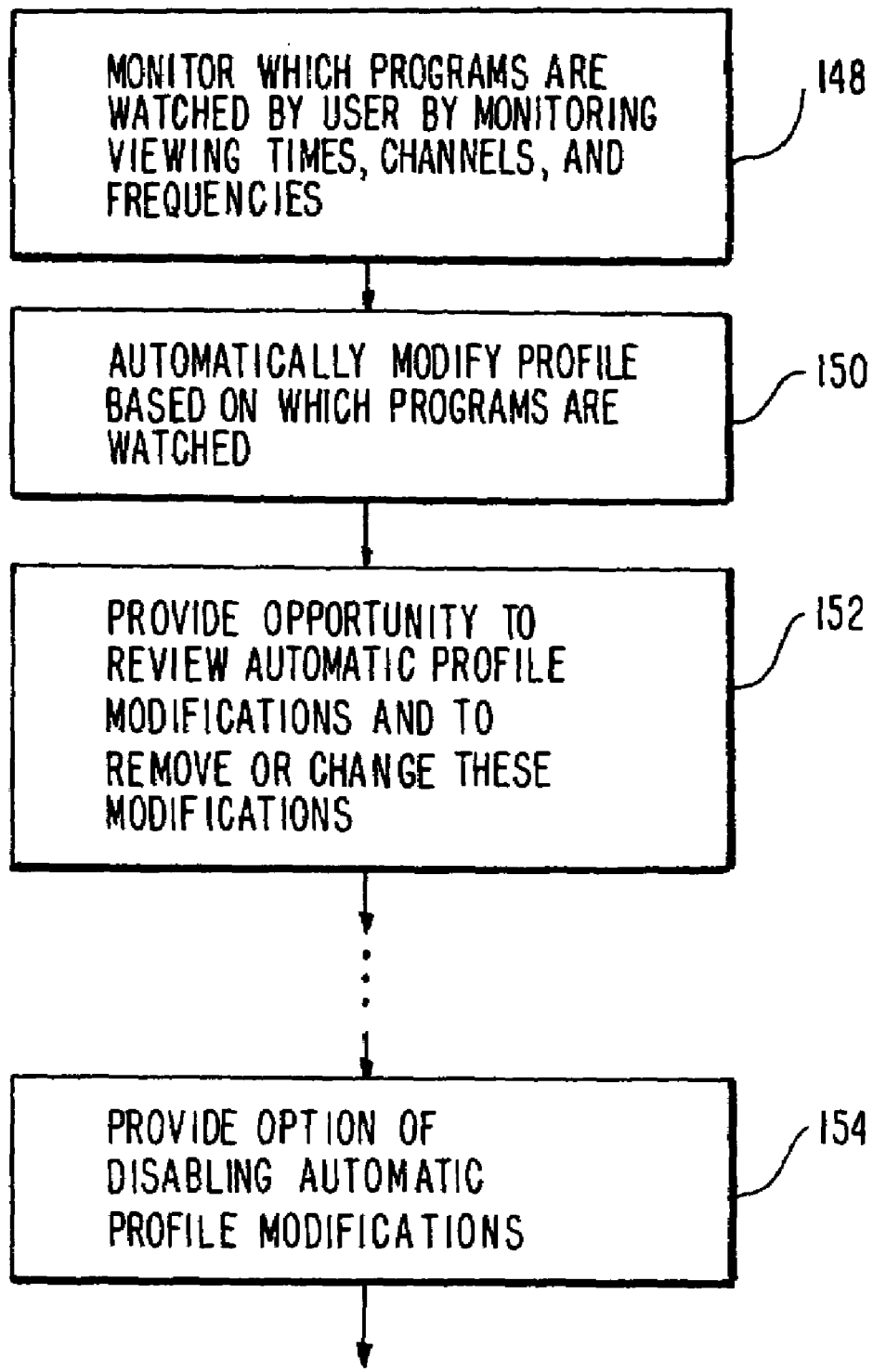
FIG. 14 is a flow chart of steps involved in automatically modifying a profile based on which programs a user watches in accordance with the present invention.

As shown in FIG. 14, the program guide may monitor the programs that are being watched by the user by monitoring the user's viewing times, channels, and the frequency with which the programs are watched (step 148). Monitoring the user's behavior in this way allows the program guide to determine the user's preferences. The program guide may modify the currently active profile based on the programs that are watched at step 150. At step 152, the program guide provides the user with an opportunity to review the automatic profile modifications and to remove or change these modifications. The program guide may also provide the user with the option of disabling the automatic profile modification feature at step 154.

Figure 15:
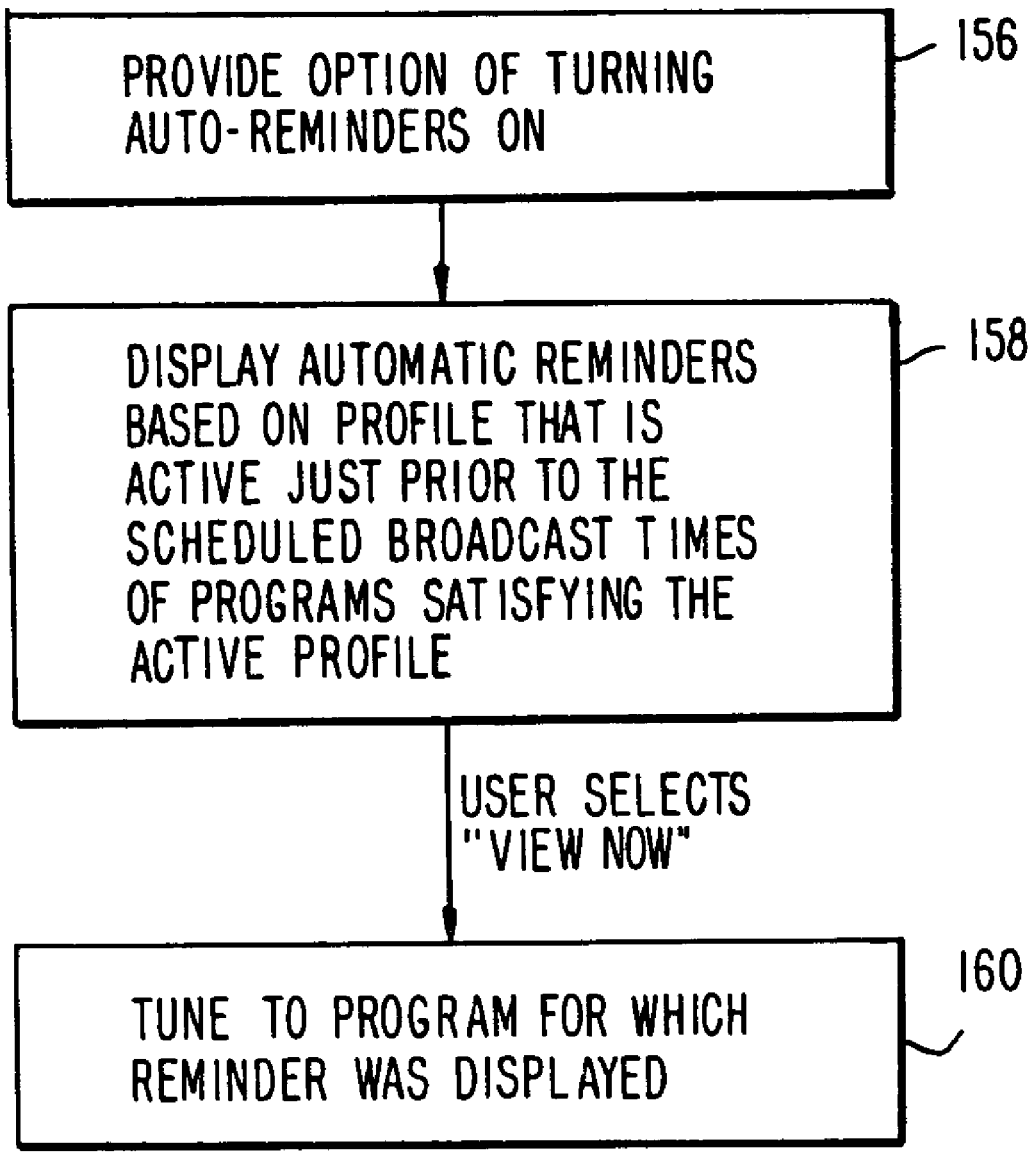
FIG. 15 is a flow chart of steps involved in using automatic reminders based on a preference profile in accordance with the present invention.

If desired, the user may direct the program guide to generate automatic program reminders for programs that satisfy the criteria in a profile. As shown in FIG. 15, the program guide may provide the option of turning on such an automatic reminders feature at step 156. If the user turns this feature on at step 156, the program guide displays automatic reminder messages on television 48 of FIG. 1 (based on the profile that is currently active) just prior to (e.g., one minute before) the scheduled broadcast times of the programs that satisfy the criteria in the profile (step 158). The program guide may present a "view now" option as part of the reminders screen used to present a reminder to the user. If the user selects the "view now" option, the program guide may tune set-top box 44 to the channel for the program for which the reminder was displayed (step 160).

Figure 16:
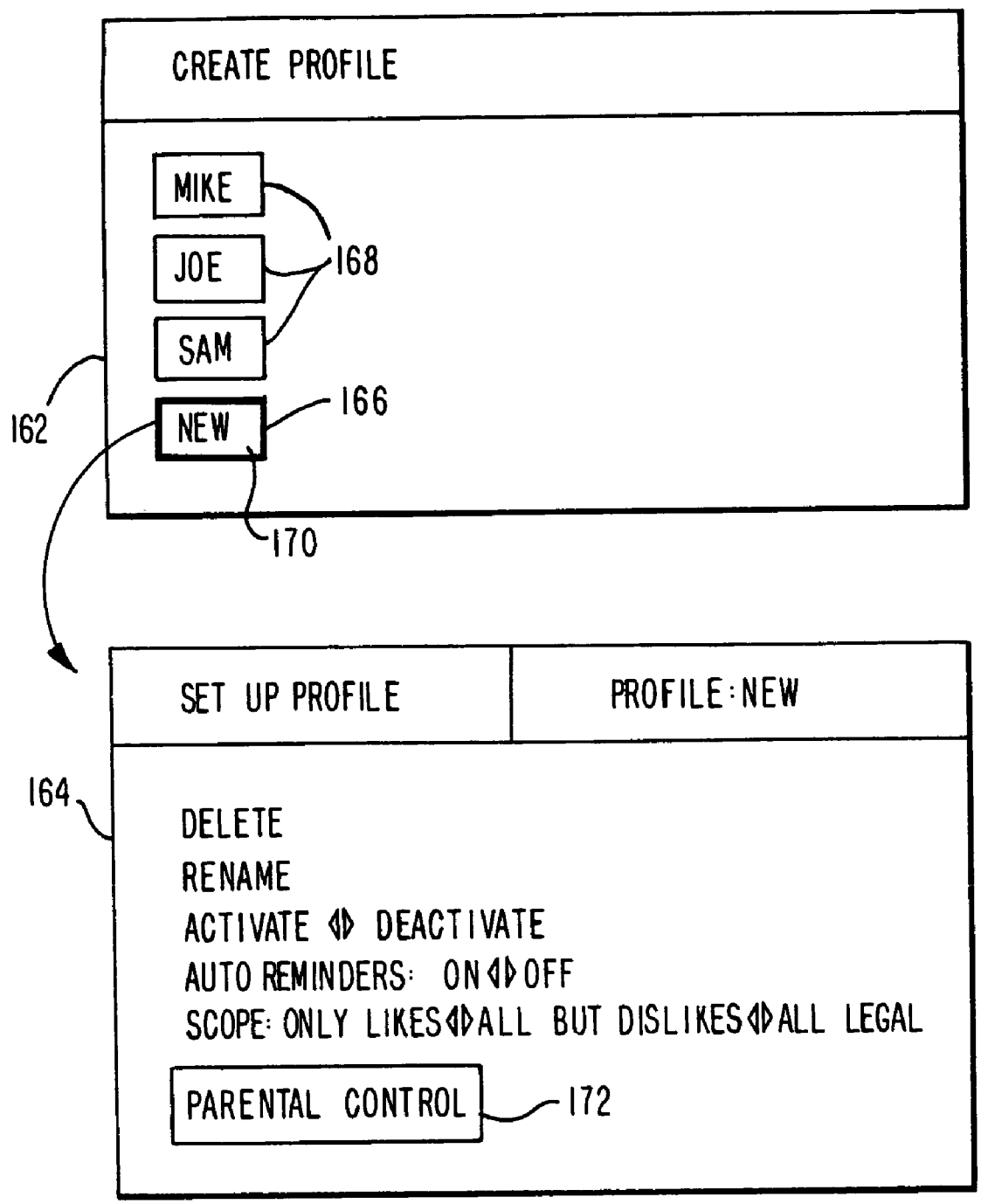
FIG. 16 is a diagram of an illustrative create profile screen and an illustrative set up profile screen in accordance with the present invention.

The program guide may allow new profiles to be created using create profile screen 162 and set up profile screen 164 of FIG. 16. The user may move highlight region 166 between various existing profile options 168 and new profile option 170 using remote control cursor keys. If new profile option 170 is selected (e.g., by pressing "OK" on the remote control), the program guide presents set up profile screen 164. Set up profile screen 164 allows the user to delete profiles, rename profiles, activate or deactivate a profile, turn the automatic reminders feature on or off, adjust the preference scope for the profile, and to adjust parental control settings. Highlight region 172 may be used to select between these various options. Parental control features that may be provided by the program guide include personal identification number (PIN) features such as activating or deactivating a PIN for a profile, selecting whether changes to preference levels requires a PIN, etc.

The preference criteria selected by a user (e.g., in the form of a preference profile) may be used by the program guide in a number of ways. For example, the program guide may use the preference criteria in a profile to restrict the number of program listings that are presented to the user, regardless of what type of display format the user has chosen to view (e.g., a by-time listing format, a by-channel listing, etc.). This approach may also be used by the program guide to restrict the channels or programs to which the user may tune (either directly or when tuning using a special program guide feature such as a browse feature or a flip feature). Alternatively, the program guide may only use the user's preferences to provide a special "favorites" program list. Another possibility is that the program guide use the preferences in all modes, but only to restrict the movement of the highlight region on the screen, not to eliminate program listings from the user's view.

Figure 17:
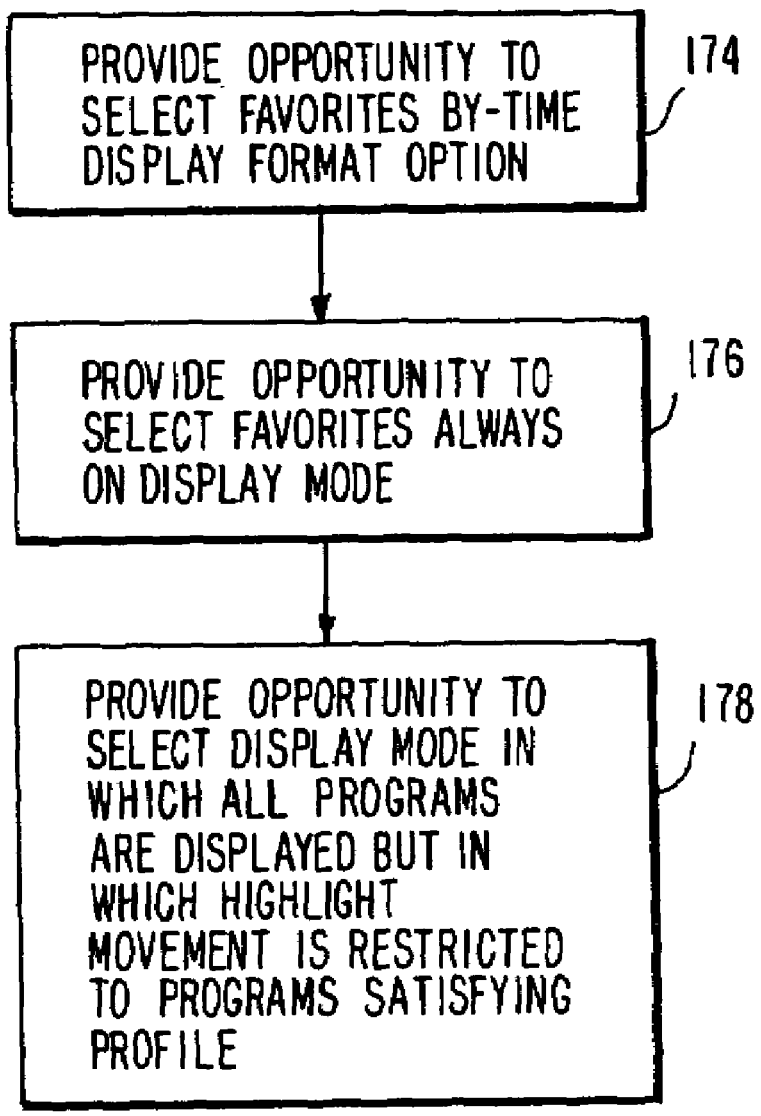
FIG. 17 is a flow chart of steps involved in providing various display mode options in accordance with the present invention.

As shown in FIG. 17, the program guide may provide the user with an opportunity to select a dedicated favorites display format option at step 174. The dedicated favorites display format may be, e.g., a time-ordered list of programs that meet the criteria set forth in the currently active profile. At step 176, the program guide may provide the user with an opportunity to select the favorites always-on display mode in which all display formats and tuning modes are restricted to the programs and channels that satisfy the user's preferences. At step 178, the program guide provides the user with the opportunity to select a display mode in which all programs are displayed, but in which highlight movement is restricted to programs satisfying the user's preferences in the active profile. Alternatively, the display format may be fixed by the program guide and the user not provided with options 174, 176, or 178.

Figure 18:
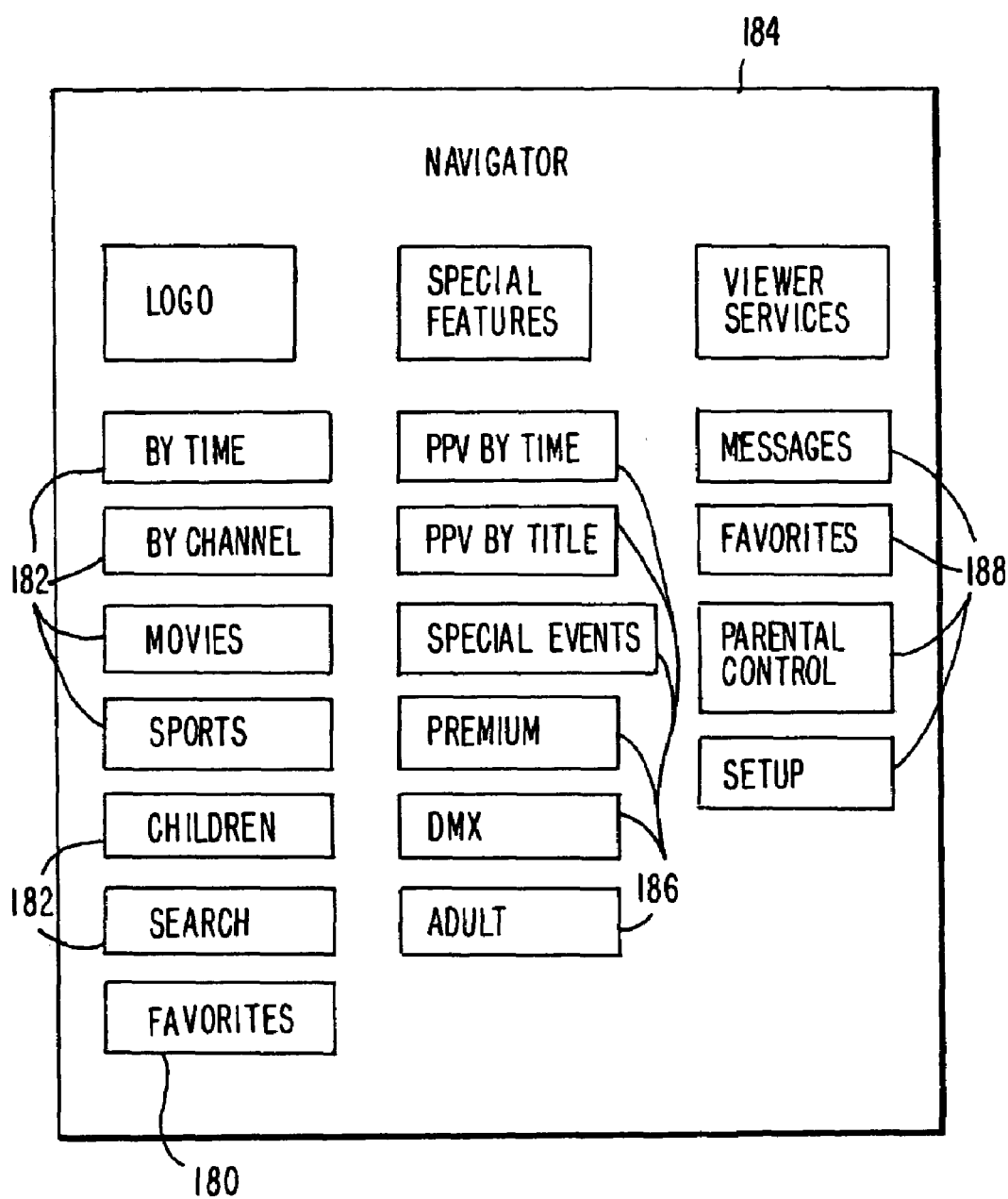
FIG. 18 is an illustrative navigator menu containing a favorites display mode option in accordance with the present invention.

An illustrative arrangement for providing the dedicated favorites display format option is shown in FIG. 18. In the FIG. 18 arrangement, dedicated favorites option 180 is offered as a clickable option at the bottom of a column of display format options 182 in a navigator menu 184. Other options available in navigator menu 184 include special features options 186 (listing of pay-per-view programs organized by time, by title, etc.) and viewer services options 188.

The type of program listings display that may be provided by the program guide when option 180 is selected is shown in FIG. 19 (i.e., following step 174 of FIG. 17). By-time favorites list 190 contains all programs that satisfy the preferences set forth in the current profile organized in a time-ordered list. The user may select another profile using left and right cursors when highlight region 192 is on profile name region 194. The user may modify the current preference scope using scope option 196.

When the user selects the always-on mode option provided at step 176 of FIG. 17, all of the program listings display formats such as those invoked by options 182 of FIG. 18 are modified to display only those programs that satisfy the user's preferences. For example, selecting by-time option 182 when the always-on mode has been selected results in a by-time favorites display of the type shown in FIG. 19.

Figure 20:
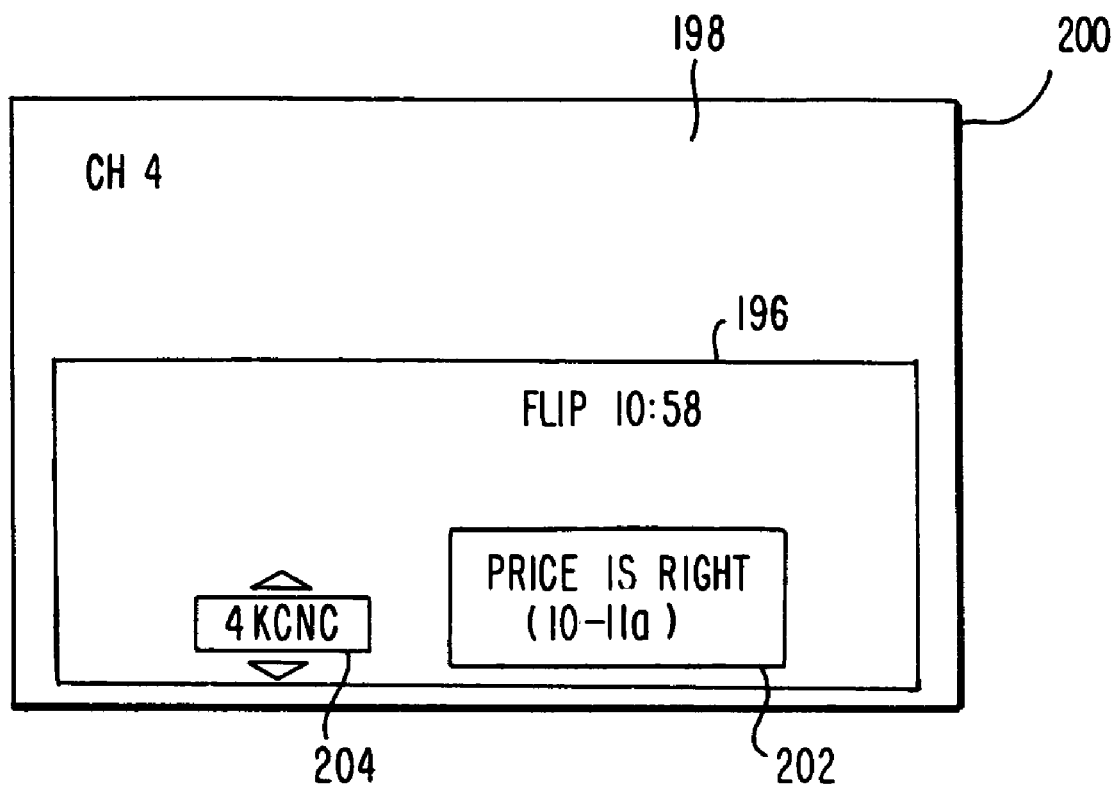
FIG. 20 is a diagram of an illustrative flip feature for the program guide in accordance with the present invention.

In addition, the programs and channels to which the program guide allows the user to tune with set-top box 44 (FIG. 1) are restricted to the programs and channels that satisfy the user's preferences when the always-on mode has been selected. The programs and channels to which the user may tune are also restricted when the user is using special tuning features. For example, the program guide may provide a special "flip" tuning feature. As shown in FIG. 20, when the user invokes the flip mode, flip display 196 is provided over a portion of a channel 198 (i.e., channel 4) that the user is currently tuned to and is watching on display screen 200. Flip display 196 contains information on programs 202 appearing on channel 204. Channel 204 is the same channel (channel 4) as the channel 198 (channel 4) to which the set-top box 44 is currently tuned. The user may change channel 204, e.g., using channel up and down keys on the remote control, which also changes the channel 198. When the always-on mode has been selected, the channels to which the user may flip are generally restricted to the channels 204 containing programs 202 that satisfy the user's preferences. If desired, the user may be provided with access to any channel, e.g., by allowing the user to enter channel numbers directly.

Figure 21:
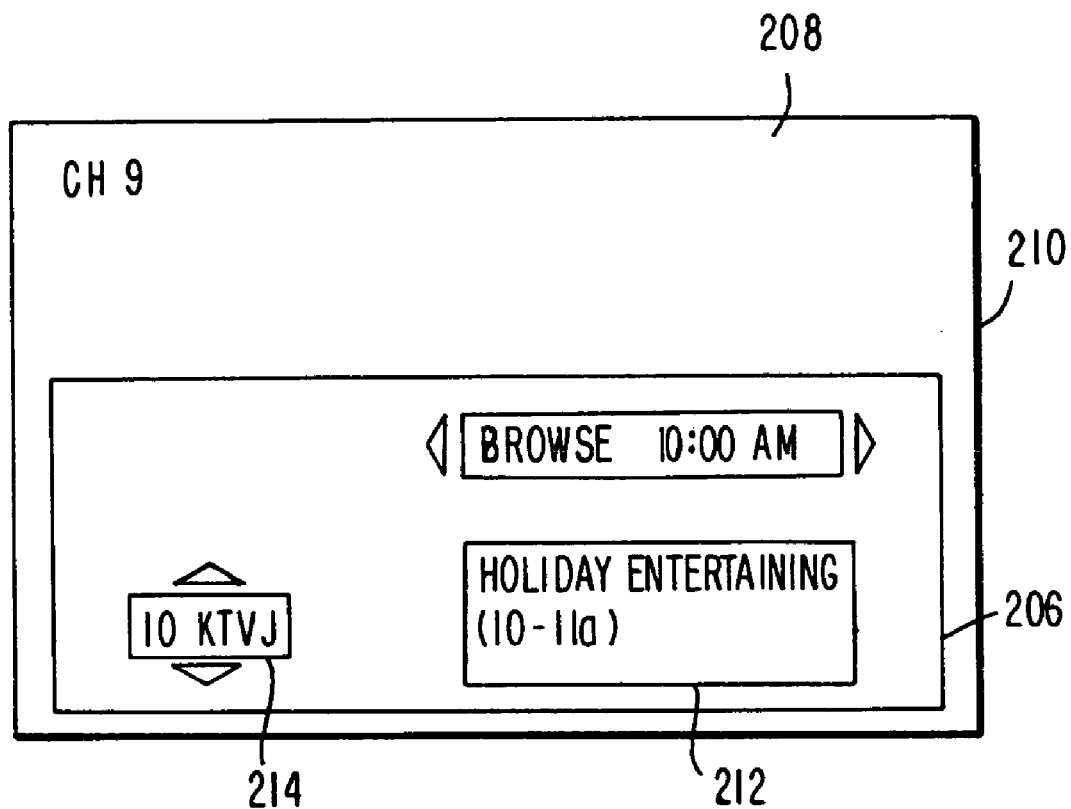
FIG. 21 is a diagram of an illustrative browse feature for the program guide in accordance with the present invention.

As shown in FIG. 21, when the user invokes the browse mode, browse display 206 is provided over a portion of a channel 208 (i.e., channel 9) which the user is currently tuned to and is watching on display screen 210. Browse display 206 contains information on programs 212 appearing on different channels 214. The user may change channels 214 using up and down cursor keys without changing channel 208. When the always-on mode has been selected, the channels 214 which the user may browse to are generally restricted to the channels 214 containing programs 212 that satisfy the user's preferences. If desired, the user may be provided with access to any channel, e.g., by allowing the user to enter channel numbers directly.

Figure 22:
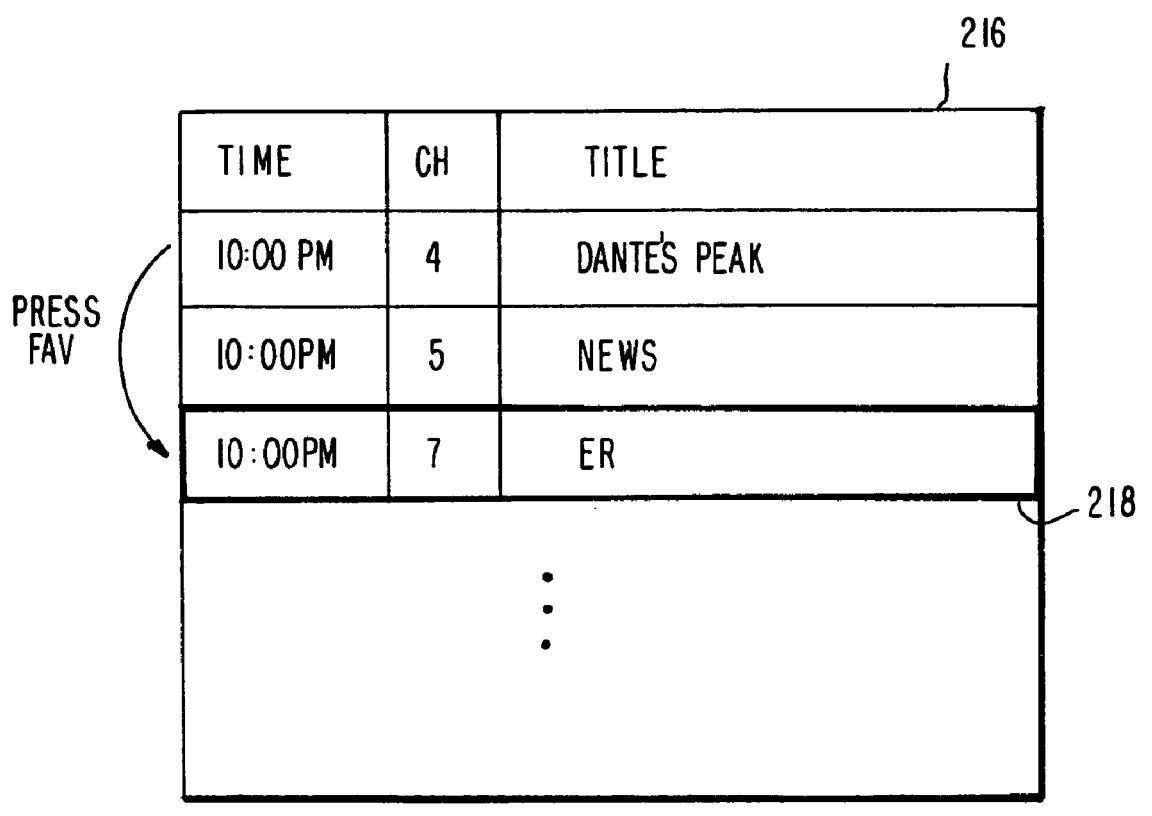

The restricted highlight movement mode option provided at step 178 of FIG. 17 may be used when the user is viewing a program listings screen such as screen 216 of FIG. 22 by pressing a key such as the favorites key to move highlight region 218 from one program that satisfies the user's preferences (e.g., Dante's Peak) to the next program that satisfies the user's preferences (e.g., ER). The user may be provided with access to all displayed programming (e.g., by allowing the user to press regular up and down cursors to access programs that do not satisfy the user's preferences).

If desired, the favorites key may be used in the flip and browse modes to advance to the next program satisfying the active profile.

Figure 23:
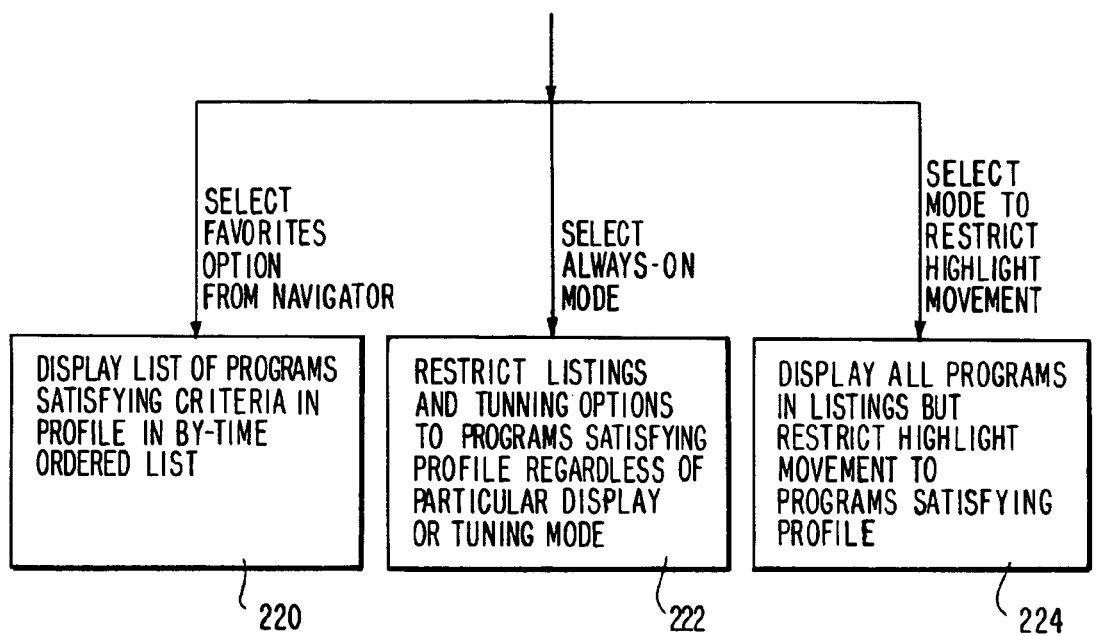
FIG. 23 is a flow chart of steps involved displaying programs in various display modes in accordance with the present invention.

FIG. 23 is a flow chart illustrating steps performed by the program guide for each of the FIG. 17 options that may be selected by the user. If option 174 of FIG. 17 is selected, the program guide displays a list of programs that satisfy the criteria in the user's profile in a dedicated favorites by-time ordered list at step 220. If option 176 of FIG. 17 is selected, the program guide restricts the listings and tuning options provided to the user to those programs that satisfy the user's profile, regardless of the particular display mode (e.g., by-time, by-channel, etc.) or tuning mode (e.g., browse, flip, etc.) of the guide at step 222. If option 178 of FIG. 17 is selected, the program guide displays all programs in the desired listings format selected by the user, but restricts highlight movement within those listings to programs that satisfy the user's preferences at step 224.

To accommodate multiple active profiles, the program guide may list programs using different colors, patterns, icons, etc. to distinguish which programs satisfy which profiles. For example, in the by-time listings display of FIG. 24, the programs Seinfeld, Dante's Peak, and ER satisfy the preference criteria in Mike's profile, as indicated by the "M" icons and the use of the red color and first distinct pattern for the cells of the grid for those listings. The programs ER and Football satisfy the preferences in John's profile, as indicated by the "J" icons and the use of the green color and second distinct pattern for the cells of the grid for those listings. The ER cell contains two colors, two patterns, and two icons indicating that the program ER satisfies the criteria in both Mike's profile and John's profile. Icons, color-coding, and patterns are merely illustrative examples of suitable visual indicators for distinguishing which programs satisfy which profiles. These approaches may be used in any suitable combination or any other suitable approach may be used to distinguish the results satisfying different profiles.

Figure 25:
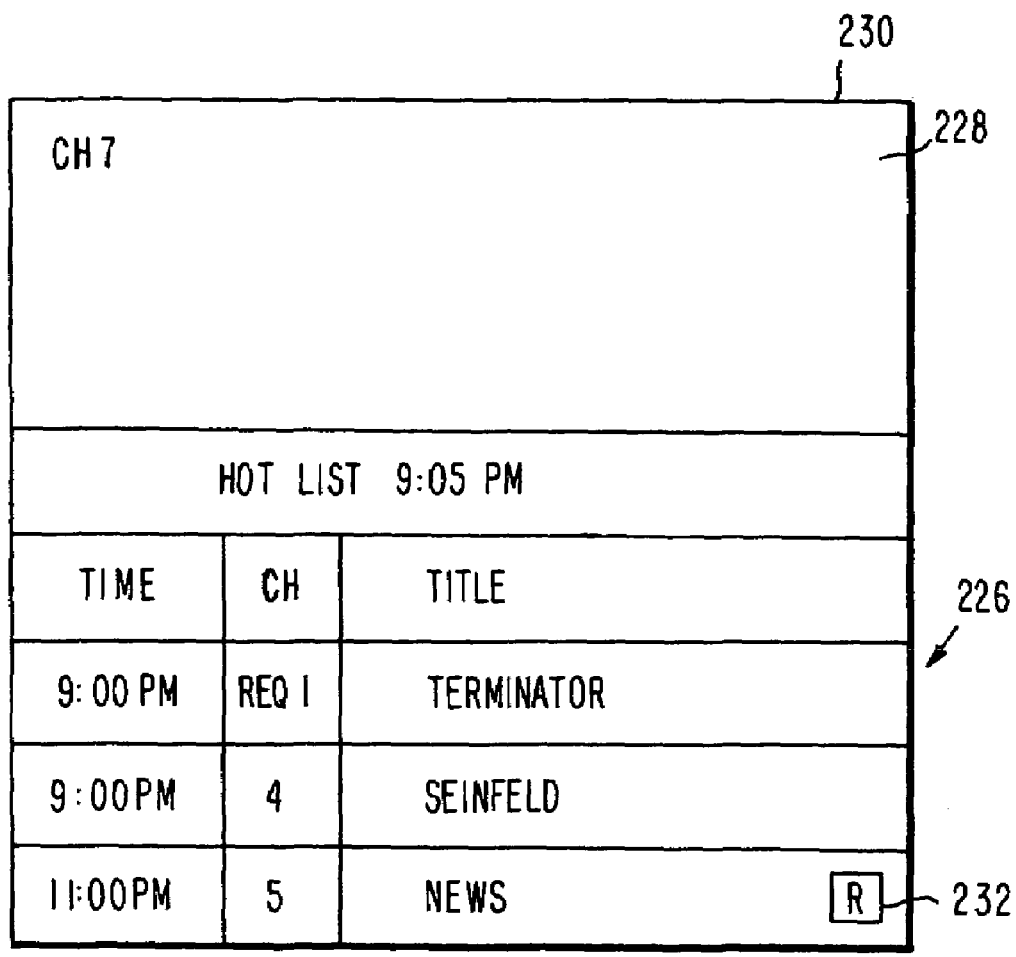
FIG. 25 is an illustrative hot list in accordance with the present invention.

As shown in FIG. 25, a hot list 226 may be provided that contains programs that match the attributes of the active profile. Hot list 226 may be displayed on top of the channel 228 (e.g., channel 7) on display 230 to which the user is currently tuned. The program guide may allow the user to display hot list 226 by pressing a single key on the remote control (e.g., an "OK" key) while watching television. Any programs for which active (non-expired) reminders have been set may be added to the hot list. In the example of FIG. 25, a reminder was set for the 11:00 news, as indicated by reminder icon 232, so the 11:00 news was included in hot list 226. Hot list 226 may be organized in start-time order or any other suitable order. Priority may be given to pay-per-view listings. For example, the program Terminator appears before the program Seinfeld in the hot list arrangement of FIG. 25, because the program Terminator appears on a pay-per-view channel (REQ 1).

Figure 26:
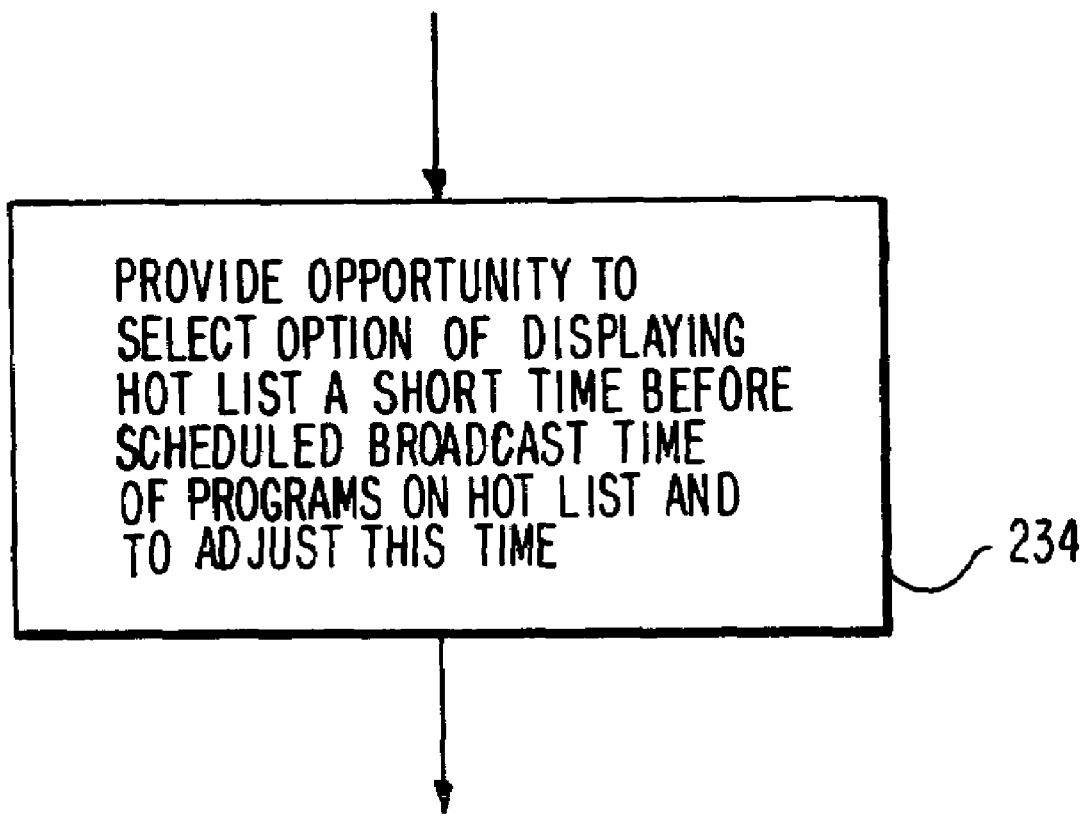
FIG. 26 is a flow chart of the step of providing the option of displaying a hot list a short time before the start time of the programs on the hot list in accordance with the present invention.

After hot list 226 is displayed, the program guide may allow the user to remove hot list 226 by pressing a single key. The program guide also allows the user to select any of the displayed programs in the list (e.g., using a highlight region) and tunes set-top box to the appropriate channel for the selected program. When there are more programs that satisfy the user's preference profile criteria than will fit on the lower portion of the display, the program guide may allow the user to scroll through the hot list entries. The program guide may remove programs from hot list 226 when they are no longer viewable. Programs may be added to hot list 226 by the program guide when the programs start, or at a specified length of time (e.g., five minutes) prior to the scheduled start time of the program. The program guide may provide the user with an opportunity to select the option of displaying the hot list a short time (e.g., one minute) before the scheduled broadcast time of programs on the list and to adjust this length of time at step 234 of FIG. 26.

Figure 27:
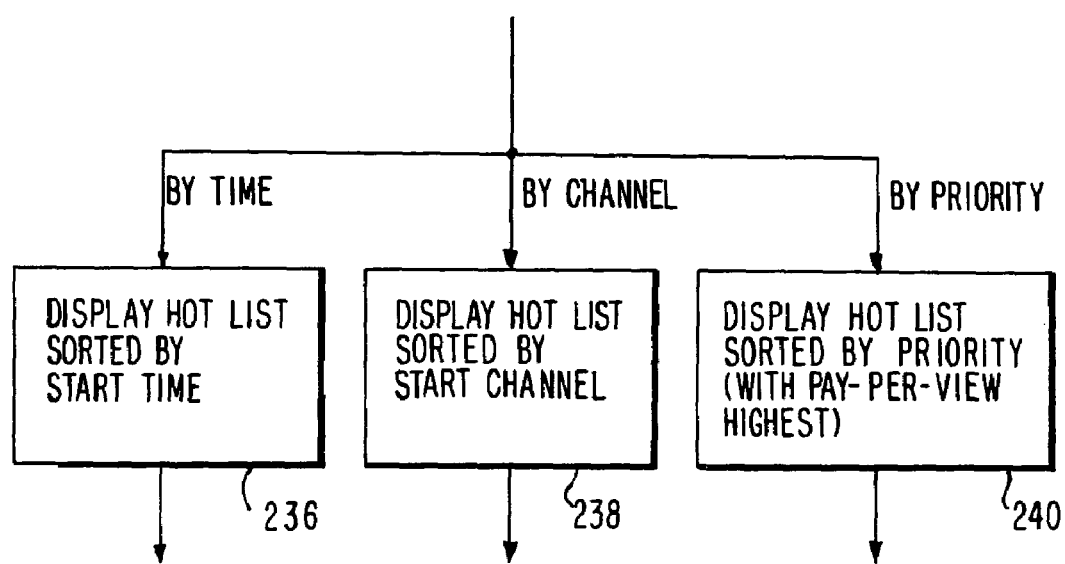
FIG. 27 is a flow chart of steps involved in displaying a hot list in various formats in accordance with the present invention.

If the user chooses to display the hot list sorted by start time, the program guide displays the list in this fashion at step 236 of FIG. 27. If the user chooses to display the hot list sorted by channel, the program guide displays a channel-ordered hot list at step 238. If the user chooses to display the hot list sorted by priority (e.g., with pay-per-view programs listed first), the program guide displays this type of listing at step 240.

Figure 28:
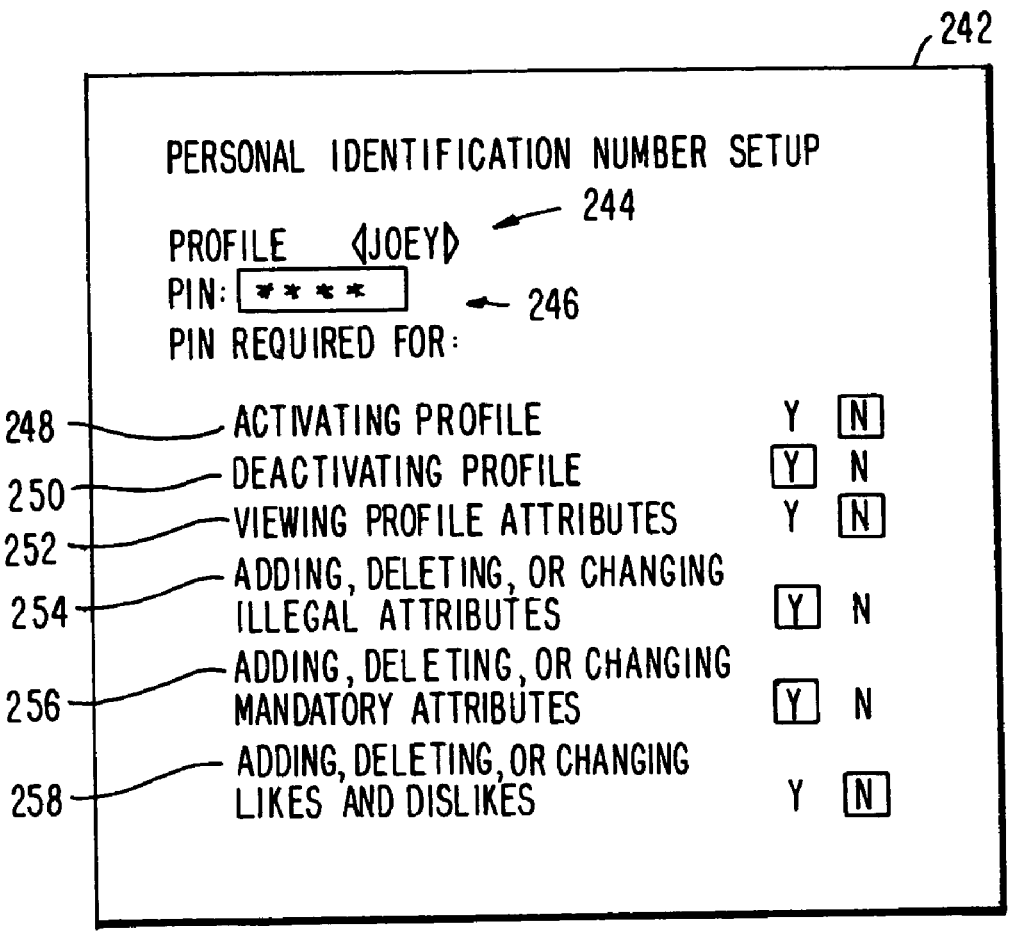
FIG. 28 is an illustrative personal identification number setup screen in accordance with the present invention.

Any profile may be assigned a PIN. As shown in FIG. 28, the program guide may provide a personal identification number setup screen 242 that contains a number of user-selectable options regarding PIN usage. For example, PIN setup screen 242 provides an option 244 that allows the user to indicate which profile is being modified. If a PIN has already been established for that profile, the user may be required to enter that PIN at option 246 to continue. If no PIN exists, option 246 may be used to create a new PIN.

Option 248 allows the user to specify whether the PIN is required to activate the profile (e.g., to activate the profile for Joey in the example of FIG. 28). Option 250 allows the user to specify whether the PIN is required for deactivating the profile. Option 252 allows the user to specify whether the PIN is required for viewing profile attributes. Option 254 allows the user to specify whether the PIN is required for adding, deleting, or changing illegal attributes. Option 256 allows the user to specify whether the PIN is required for adding deleting or changing mandatory attributes. Option 258 allows the user to specify whether the PIN is required for adding deleting, or changing likes and dislikes. The options shown in setup screen 242 are illustrative only. For example, if other preference levels are used, options regarding PIN usage for those levels may be provided using screen 242. Any other suitable arrangement may be used by the program guide to allow the user to adjust PIN control levels, if desired.

The arrangement of FIG. 28 allows the user to use PIN controlled profiles for parental control. For example, a parent can set up a child's profile with a restrictive set of preference attributes (e.g., with a mandatory G rating and a preference level of illegal associated with the genre cartoons). By requiring that a PIN be used to deactivate the profile or to change the preference level attributes, the parent can ensure that the child will only be able to watch G-rated programming and no cartoons when the child's profile is active. A different profile may be created for use when the child's viewing is being closely supervised.

Particularly in situations in which parents wish to set limits on the viewing of their children, it may be desirable to use a master profile that contains settings that override the settings in all other profiles. As shown in FIG. 29, such a master profile may contain illegal preference attributes (e.g., illegal ratings) and mandatory preference attributes. The master profile may also contain other preference settings (e.g., with various preference levels of like, dislike, etc.) The illegal and mandatory attributes of the master profile are controlling. Accordingly, even if profile Joey contains a mandatory R rating setting, the illegal R rating setting in the master profile of FIG. 29 dictates that no R rated programs will be allowed. Similarly, the mandatory English setting in the master profile dictates that English is a required attribute, regardless of the language setting in other profiles. Conflicts between the master profile and other profiles with respect to attributes other than mandatory and illegal attributes may also be resolved in favor of the master profile if desired.

Figure 30:
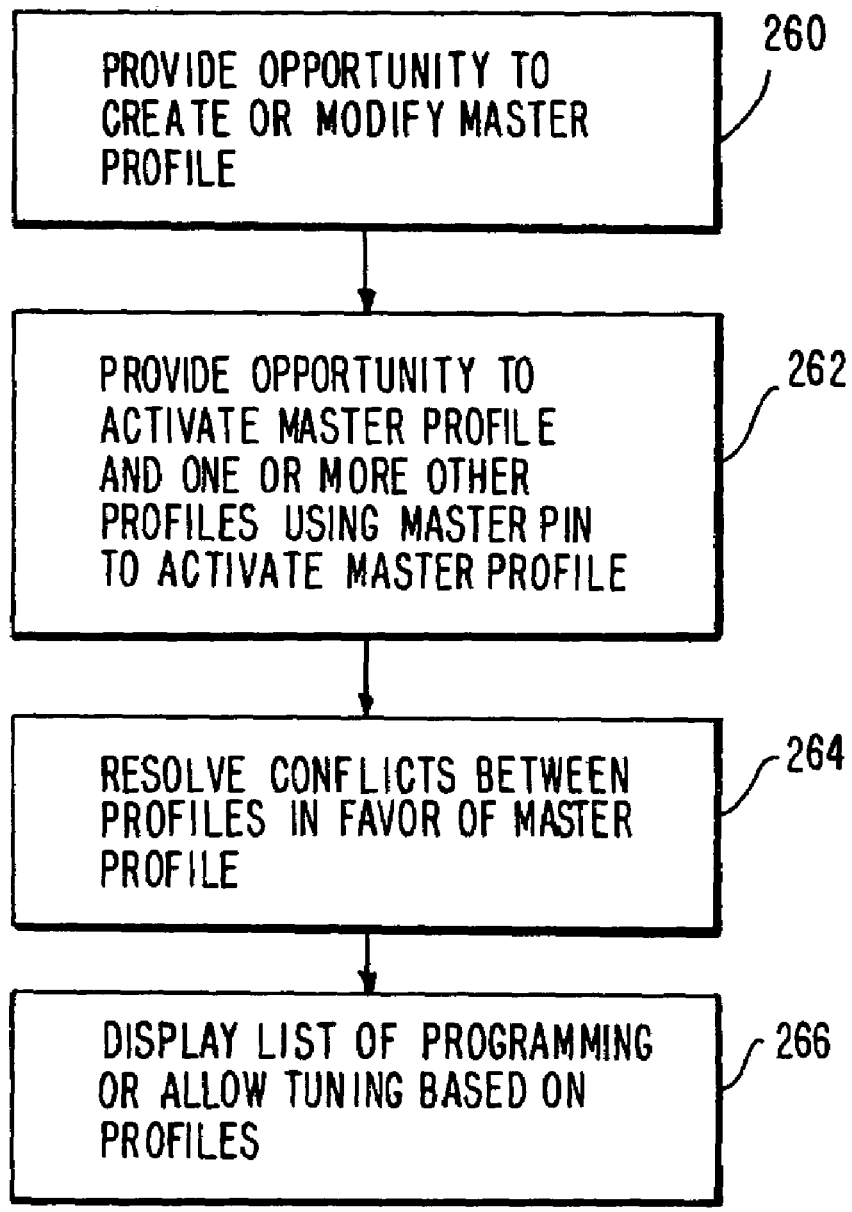
FIG. 30 is a flow chart of illustrative steps involved in using a master profile in accordance with the present invention.

Steps involved in using master profiles are shown in FIG. 30. At step 260, the program guide provides the user with an opportunity to create or modify a master profile. Step 260 typically involves setting up a master PIN that may be used for parental control. At step 262, the program guide may provide the user with an opportunity to activate the master profile. One or more other profile may also be activated at step 262. Typically, the master PIN is used to activate the master profile. Because the master PIN is generally not known by children, the master PIN provides parents with global control over programming. If desired, once the master PIN has been set up in the system, entering the master PIN may allow the user to modify the profiles of their children.

As step 264, the program guide resolves conflicts between the preference criteria in the various profiles in favor of the master profile. After (or at the same time) such conflicts are resolved, the program guide may display a list of programming or allow tuning to certain channels based on the criteria in the active profiles at step 266.

If desired, the program guide may provide an opportunity for the user to select whether the program titles, descriptions, etc. for programs that do not satisfy a given preference profile should be hidden from view. This feature is useful in situations in which a pareent not only wishes to restrict the viewing options of a child, but also wishes to prevent the child from being able to view information on programming that does not satisfy a given profile (e.g., the master profile). When the user directs the program guide to block the titles and descriptions for programs that do not satisfy the profile, the program guide may display a message such as "restricted" on various program guide display screens in place of the program listings for the blocked programs. The option of replacing non-favorite program listings with a "restricted" message may be placed inder master PIN control.

Another feature provided by the program guide relates to profile settings for non-program items. For example, a profile setting may be used to define various audio settings 268 for user television equipment 40 (stereo, mono, Dolby on/off, bass and treble settings, etc.), as shown in FIG. 31. Display settings 270 such as brightness, contrast, the language of the text displayed in the program guide, etc. may also be associated with a given profile (e.g., the profile "Mike"). Audio settings 268 and display settings 270 are examples of non-program settings that may be associated with a profile. If desired, other suitable non-program settings may also be associated with a profile.

Figure 32:
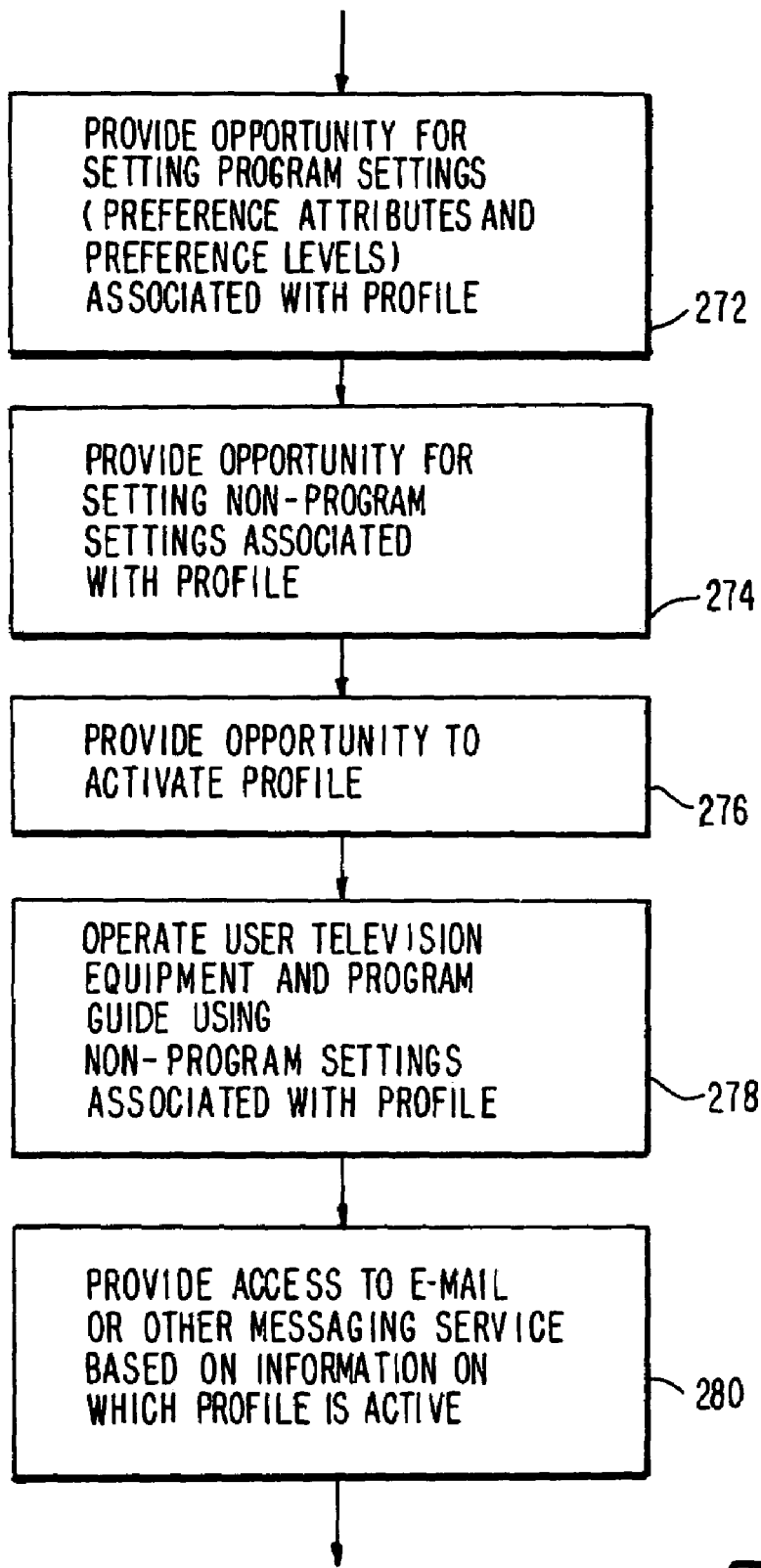
FIG. 32 is a flow chart of illustrative steps involved in using a preference profile to specify certain non-program settings in accordance with the present invention.

As shown in FIG. 32, the program guide may provide the user with an opportunity for setting program settings (preference attributes, preference levels, preference scope, etc.) for a given profile at step 272. At step 274, the program guide may provide the user with an opportunity to set non-program settings associated with that profile. At step 276, the program guide may provide an opportunity to activate the profile. At step 278, the user television equipment and the program guide are operated using the non-program settings.

Because the program guide knows which profile is active (e.g., Mike or Joey, etc.) at a given time, the program guide may use this information in providing various services. For example, the program guide may provide access to a program guide e-mail service or other messaging service using information about which profile is currently active (step 280). This allows a user to access e-mail, for example, without having to separately log into the e-mail service. If Mike's profile is currently active, the program guide can retrieve messages addressed to Mike. If Joey's profile is active, the program guide can provide access to Joey's messages. If more than one profile is active, the program guide can provide access to the messaging service to the users of all active profiles or may require that each user log in separately.

The foregoing is merely illustrative of the principles of this invention and various modifications can be made by those skilled in the art without departing from the scope and spirit of the invention.

What is claimed is:

1. A television program guide system implemented on user television equipment, comprising:
    means for providing an option for a user to create a preference profile that is indicative of the user's television programming interests;
    means for providing an option for the user to display a hot list a predetermined period of time before the scheduled broadcast times of programs on the hot list;
    means for providing an option for the user to adjust the predetermined period of time; and
    means for displaying the hot list of programs on the user television equipment, wherein all of the programs on the hot list are based on the preference profile and all of the programs on the hot list are substantially currently available for viewing by the user.

2. The television program guide system defined in claim 1 wherein the means for providing the option for the user to create the preference profile further comprises:
    means for providing an option for the user to select a plurality of preference attributes that are indicative of the user's television programming interests; and
    means for providing an option for the user to select one of at least several preference levels for each of the plurality of selected preference attributes, wherein the selected preference attributes and the selected preference levels are associated with the preference profile.

3. The television program guide system defined in claim 2 further comprising means for providing an option of selecting a preference scope that is associated with the preference profile.

4. The television program guide system defined in claim 2 wherein there are multiple profiles, the system further comprising means for providing an option of selecting which of the profiles to make active.

5. The television program guide system defined in claim 4 further comprising means for turning on an auto-reminders feature.

6. The television program guide system defined in claim 5 wherein a given one of the profiles is active, the system further comprising means for displaying automatic reminders when the auto-reminders feature is turned on based on the active profile just prior to the scheduled broadcast times of programs satisfying the active profile.

7. The television program guide system defined in claim 6 further comprising:
means for providing a view now option for programs for which automatic reminders are displayed; and
means for tuning to a given one of the programs for which the automatic reminders are displayed when the user selects the view now option for that program.

8. The television program guide system defined in claim 4 wherein at least two of the preference profiles are active, and wherein the means for displaying the hot list of programs based on the at least two preference profiles further comprises means for indicating which of the programs in the hot list of programs satisfy which of the preference profiles.

9. The television program guide system defined in claim 8 wherein the means for indicating comprises means for listing the programs that satisfy one of the two profiles using one color and the programs that satisfy the other of the two profiles using another color.

10. The television program guide system defined in claim 8 wherein the means for indicating comprises means for listing the programs that satisfy one of the two profiles using one pattern and the programs that satisfy the other of the two profiles using another pattern.

11. The television program guide system defined in claim 8 wherein the means for indicating comprises means for listing the programs that satisfy one of the two profiles using one icon and the programs that satisfy the other of the two profiles using another icon.

12. The television program guide system defined in claim 4 wherein the means for displaying the hot list of programs further comprises means for displaying the hot list of programs based on the multiple profiles.

13. The television program guide system defined in claim 4 further comprising means for allowing tuning to certain channels based on the multiple profiles.

14. The television program guide system defined in claim 1 further comprising means for allowing the user to tune to a selected program, wherein the means for providing the option of creating the preference profile further comprises means for creating the preference profile based on characteristics of the selected program.

15. The television program guide system defined in claim 14 wherein the means for creating the preference profile based on the characteristics of the selected program further comprises means for creating the preference profile based on the title of the selected program.

16. The television program guide system defined in claim 14 wherein the means for creating the preference profile based on the characteristics of the selected program further comprises means for creating the preference profile based on the genre of the selected program.

17. The television program guide system defined in claim 14 wherein the means for creating the preference profile based on the characteristics of the selected program further comprises means for creating the preference profile based on the channel of the selected program.

18. The television program guide system defined in claim 14 wherein the means for creating the preference profile based on the characteristics of the selected program further comprises means for creating the preference profile based on the rating of the selected program.

19. The television program guide system defined in claim 1 further comprising means for allowing the user to highlight a given program listing, wherein the means for providing the option of creating the preference profile further comprises means for creating the preference profile based on characteristics of the highlighted program listing.

20. The television program guide system defined in claim 19 wherein the means for creating the preference profile based on the characteristics of the highlighted program listing further comprises means for creating the preference profile based on the title of the highlighted program listing.

21. The television program guide system defined in claim 19 wherein the means for creating the preference profile based on the characteristics of the highlighted program listing further comprises means for creating the preference profile based on the genre of the highlighted program listing.

22. The television program guide system defined in claim 19 wherein the means for creating the preference profile based on the characteristics of the highlighted program listing further comprises means for creating the preference profile based on the channel of the highlighted program listing.

23. The television program guide system defined in claim 19 wherein the means for creating the preference profile based on the characteristics of the highlighted program listing further comprises means for creating the preference profile based on the rating of the highlighted program listing.

24. The television program guide system defined in claim 1 further comprising:
means for allowing the user to tune to a selected program; and
means for modifying a preference profile with which the selected preference attributes and the selected preference levels are associated based on the characteristics of the selected program.

25. The television program guide system defined in claim 1 further comprising:
means for allowing the user to highlight a given program listing; and
means for modifying a preference profile with which the selected preference attributes and the selected preference levels are associated based on the characteristics of the highlighted program listing.

26. The television program guide system defined in claim 1 further comprising means for providing a profiles display with which the user may modify a preference profile with which the selected preference attributes and the selected preference levels are associated.

27. The television program guide system defined in claim 1 wherein the means for displaying the hot list further comprises means for providing the hot list sorted by start time.

28. The television program guide system defined in claim 1 wherein the means for displaying the hot list further comprises means for displaying the hot list sorted by channel.

29. The television program guide system defined in claim 1 wherein the means for displaying the hot list further comprises means for displaying the hot list sorted by priority.

30. The television program guide system defined in claim 29 wherein the means for displaying the hot list sorted by priority further comprises means for displaying the hot list with pay-per-view programming having highest priority and being listed first.

31. The television program guide system defined in claim 2 further comprising means for allowing tuning to certain channels based on the selected preference attributes and selected preference levels.

32. The television program guide system defined in claim 31 further comprising means for providing an option of specifying a sort order for each of the selected preference attributes.

33. The television program guide system defined in claim 32 further comprising means for allowing tuning to certain channels based on the specified sort order.

34. The television program guide system defined in claim 1 further comprising means for monitoring which programs are watched by the user.

35. The television program guide system defined in claim 34 wherein the means for monitoring which programs are watched by the user further comprises means for monitoring viewing times, channels, and frequencies.

36. The television program guide system defined in claim 34 further comprising means for automatically modifying a preference profile based on which programs are watched by the user.

37. The television program guide system defined in claim 36 further comprising means for providing an opportunity to review and modify automatic profile modifications made by the means for automatically modifying.

38. The television program guide system defined in claim 36 further comprising means for disabling the means for automatically modifying.

39. The television program guide system defined in claim 1 further comprising means for providing a personal identification number setup screen.

40. The television program guide system defined in claim 39 wherein the means for providing the personal identification number setup screen further comprises means for providing a plurality of personal identification number options associated with a preference profile.

41. The television program guide system defined in claim 40 wherein the means for providing the personal identification number options further comprises means for setting whether a personal identification number is required for activating the profile.

42. The television program guide system defined in claim 40 wherein the means for providing the personal identification number options further comprises means for setting whether a personal identification number is required for deactivating the profile.

43. The television program guide system defined in claim 2 further comprising means for providing a personal identification number setup screen, wherein the means for providing the personal identification number options further comprises:
   means for providing a plurality of personal identification number options associated with a preference profile with which the selected preference attributes and the selected preference levels are associated; and
   means for setting whether a personal identification number is required for viewing which preference attributes are associated with the profile.

44. The television program guide system defined in claim 2 further comprising means for providing a personal identification number setup screen, wherein the means for providing the personal identification number options further comprises:
   means for providing a plurality of personal identification number options associated with a preference profile with which the selected preference attributes and the selected preference levels are associated; and
   means for setting whether a personal identification number is required for modifying which preference attributes have an associated preference level of illegal.

45. The television program guide system defined in claim 2 further comprising means for providing a personal identification number setup screen, wherein the means for providing the personal identification number options further comprises:
   means for providing a plurality of personal identification number options associated with a preference profile with which the selected preference attributes and the selected preference levels are associated; and
   means for setting whether a personal identification number is required for modifying which preference attributes have an associated preference level of mandatory.

46. The television program guide system defined in claim 2 further comprising means for providing a personal identification number setup screen, wherein the means for providing the personal identification number options further comprises:
   means for providing a plurality of personal identification number options associated with a preference profile with which the selected preference attributes and the selected preference levels are associated; and
   means for setting whether a personal identification number is required for modifying like and dislike preference levels.

47. The television program guide system defined in claim 2 wherein the means for providing the option for the user to select a plurality of preference attributes further comprises means for providing an option of selecting a given airing of a program as a preference attribute.

48. The television program guide system defined in claim 47 further comprising means for allowing the given airing of the program selected as a preference attribute to expire after the program has been aired.

49. The television program guide system defined in claim 2 wherein the means for providing the option for the user to select a plurality of preference attributes further comprises means for providing an option of selecting a broadcast characteristic as a preference attribute.

50. The television program guide system defined in claim 49 wherein the means for providing the option of selecting a broadcast characteristic as a preference attribute further comprises means for providing closed-captioning as a preference attribute.

51. The television program guide system defined in claim 49 wherein the means for providing the option of selecting a broadcast characteristic as a preference attribute further comprises means for providing second audio program as a preference attribute.

52. The television program guide system defined in claim 2 further comprising means for providing an option of specifying a sort order for each of the selected preference attributes.

53. The television program guide system defined in claim 52 further comprising means for displaying the list of programming based on the specified sort order.

54. The television program guide system defined in claim 2 further comprising means for providing the user with an option of selecting a preference scope.

55. The television program guide system defined in claim 54 further comprising means for displaying the list of programming based on the selected preference scope.

56. The television program guide system defined in claim 54 further comprising means for allowing tuning to certain channels based on the selected preference scope.

57. The television program guide system defined in claim 54 wherein the means for providing the user with the option of selecting the preference scope further comprises means for selecting a preference scope selected from the group consisting of: narrow scope, moderate scope, and wide scope.

58. The television program guide system defined in claim 54 wherein the preference levels include like, dislike, illegal, and mandatory, and wherein the means for providing the user with the option of selecting the preference scope further comprises means for selecting a preference scope that includes liked programs that are not more disliked and that have all mandatory attributes and no illegal attributes.

59. The television program guide system defined in claim 54 wherein the preference levels include like, dislike, illegal, and mandatory, and wherein the means for providing the user with the option of selecting the preference scope further comprises means for selecting a preference scope that includes programs that have no disliked preference attributes and that have all mandatory attributes and no illegal attributes.

60. The television program guide system defined in claim 54 wherein the preference levels include like, dislike, illegal, and mandatory, and wherein the means for providing the user with the option of selecting the preference scope further comprises means for selecting a preference scope that includes programs that have all mandatory attributes and no illegal attributes.

61. The television program guide system defined in claim 2 wherein the means for providing the option for the user to select a plurality of preference attributes further comprises means for providing an option of selecting a type of channel as a preference attribute.

62. The television program guide system defined in claim 2 wherein the means for providing the option for the user to select a plurality of preference attributes further comprises means for providing an option of selecting a program series as a preference attribute.

63. The television program guide system defined in claim 2 wherein the means for providing the option for the user to select a plurality of preference attributes further comprises means for providing an option of selecting a genre of programming as a preference attribute.

64. The television program guide system defined in claim 2 wherein the means for providing the option for the user to select a plurality of preference attributes further comprises means for providing an option of selecting at least one rating as a preference attribute.

65. The television program guide system defined in claim 2 wherein the means for providing the option for the user to select a plurality of preference attributes further comprises means for providing an option of selecting a given actor or actress as a preference attribute.

66. The television program guide system defined in claim 2 wherein the means for providing the option for the user to select a plurality of preference attributes further comprises means for providing an option of selecting a given topic as a preference attribute.

67. The television program guide system defined in claim 2 wherein the means for providing the option for the user to select a plurality of preference attributes further comprises means for providing an option of selecting a word in a program description as a preference attribute.

68. The television program guide system defined in claim 2 wherein the means for providing the option for the user to select a plurality of preference attributes further comprises means for providing an option of selecting a given program start time as a preference attribute.

69. The television program guide system defined in claim 2 wherein the means for providing the option for the user to select a plurality of preference attributes further comprises means for providing an option of selecting a range of broadcast times as a preference attribute.

70. The television program guide system defined in claim 2 wherein the means for providing the option for the user to select a plurality of preference attributes further comprises means for providing an option of selecting original programming as a preference attribute.

71. The television program guide system defined in claim 2 wherein the means for providing the option for the user to select a plurality of preference attributes further comprises means for providing an option of selecting a given language as a preference attribute.

72. The television program guide system defined in claim 2 wherein the means for providing the option for the user to select a plurality of preference attributes further comprises means for providing an option of selecting a critics rating as a preference attribute.

73. The television program guide system defined in claim 2 further comprising means for providing an option of deselecting at least one of the selected preference attributes.

74. The television program guide system defined in claim 2 wherein the preference levels include at least like and dislike.

75. The television program guide system defined in claim 2 wherein the preference levels include at least strong like and weak like.

76. The television program guide system defined in claim 2 wherein the preference levels include at least strong dislike and weak dislike.

77. The television program guide system defined in claim 1 further comprising means for providing an option for creating a master preference profile.

78. The television program guide system defined in claim 1 wherein a plurality of preference profiles including a master preference profile are active, the system further comprising means for resolving conflicts between preference profiles in favor of the master preference profile.

79. The television program guide system defined in claim 1 wherein a master preference profile that is accessed by a master personal identification number is used to define certain television viewing preferences, the system further comprising means for displaying the hot list of programs based on the master profile.

80. The television program guide system defined in claim 2 wherein a master preference profile that is accessed by a master personal identification number is used to define certain television viewing preferences, the means for displaying the hot list of programs further comprising means for displaying the hot list of programs based on selected preference attributes and selected preference levels in the master profile.

81. The television program guide system defined in claim 1 further comprising means for providing an opportunity for setting non-program settings associated with the preference profile.

82. The television program guide system defined in claim 1 further comprising means for providing an opportunity for setting non-program settings associated with the preference profile, wherein the non-program settings include audio settings for the user television equipment.

83. The television program guide system defined in claim 1 further comprising means for providing an opportunity for setting non-program settings associated with the preference profile, wherein the non-program settings include display settings.

84. The television program guide system defined in claim 1 further comprising:
   means for providing an opportunity for creating multiple preference profiles;
   means for providing an option of selecting which of the profiles to make active; and
   means for providing access to a messaging service based on information on which profile is active.

85. The television program guide system of claim 1, wherein the hot list includes at least one program with an active non-expired reminder.

86. The television program guide system of claim 1 further comprising means for allowing the user to tune to a program on the hot list.

87. The television program guide system of claim 1 further comprising means for allowing the user to direct the television program guide system to display the hot list.

88. A method for using a television program guide system implemented on user television equipment, the method comprising:
   providing an option for a user to create a preference profile that is indicative of the user's television programming interests;
   providing an option for the user to display a hot list a predetermined period of time before the scheduled broadcast times of programs on the hot list;
   providing an option for the user to adjust the predetermined period of time; and
   displaying the hot list of programs on the user television equipment, wherein all of the programs on the hot list are based on the user's preference profile and all of the programs on the hot list are substantially currently available for viewing by the user.

89. The method of claim 88 wherein providing the option for the user to create the preference profile further comprises:
   providing an option for the user to select a plurality of preference attributes that are indicative of the user's television programming interests; and
   providing an option for the user to select one of at least several preference levels for each of the plurality of selected preference attributes, wherein the selected preference attributes and the selected preference levels are associated with the preference profile.

90. The method of claim 89 further comprising providing an option of selecting a preference scope that is associated with the preference profile.

91. The method of claim 89 wherein there are multiple profiles, the method further comprising providing an option of selecting which of the profiles to make active.

92. The method of claim 91 further comprising turning on an auto-reminders feature.

93. The method of claim 92 wherein a given one of the profiles is active, the method further comprising displaying automatic reminders when the auto-reminders feature is turned on based on the active profile just prior to the scheduled broadcast times of programs satisfying the active profile.

94. The method of claim 93 further comprising:
   providing a view now option for programs for which automatic reminders are displayed; and
   tuning to a given one of the programs for which the automatic reminders are displayed when the user selects the view now option for that program.

95. The method of claim 91 wherein at least two of the preference profiles are active, and wherein displaying the hot list of programs based on the at least two preference profiles further comprises indicating which of the programs in the hot list of programs satisfy which of the preference profiles.

96. The method of claim 95 wherein indicating comprises listing the programs that satisfy one of the two profiles using one color and the programs that satisfy the other of the two profiles using another color.

97. The method of claim 95 wherein indicating comprises listing the programs that satisfy one of the two profiles using one pattern and the programs that satisfy the other of the two profiles using another pattern.

98. The method of claim 95 wherein indicating comprises listing the programs that satisfy one of the two profiles using one icon and the programs that satisfy the other of the two profiles using another icon.

99. The method of claim 91 wherein displaying the hot list of programs further comprises displaying the hot list of programs based on the multiple profiles.

100. The method of claim 91 further comprising allowing tuning to certain channels based on the multiple profiles.

101. The method of claim 88 further comprising allowing the user to tune to a selected program, wherein providing the option of creating the preference profile further comprises creating the preference profile based on characteristics of the selected program.

102. The method of claim 101 wherein creating the preference profile based on the characteristics of the selected program further comprises creating the preference profile based on the title of the selected program.

103. The method of claim 101 wherein creating the preference profile based on the characteristics of the selected program further comprises creating the preference profile based on the genre of the selected program.

104. The method of claim 101 wherein creating the preference profile based on the characteristics of the selected program further comprises creating the preference profile based on the channel of the selected program.

105. The method of claim 101 wherein creating the preference profile based on the characteristics of the selected program further comprises creating the preference profile based on the rating of the selected program.

106. The method of claim 88 further comprising allowing the user to highlight a given program listing, wherein providing the option of creating the preference profile further comprises creating the preference profile based on characteristics of the highlighted program listing.

107. The method of claim 106 wherein creating the preference profile based on the characteristics of the highlighted program listing further comprises creating the preference profile based on the title of the highlighted program listing.

108. The method of claim 106 wherein creating the preference profile based on the characteristics of the highlighted program listing further comprises creating the preference profile based on the genre of the highlighted program listing.

109. The method of claim 106 wherein creating the preference profile based on the characteristics of the highlighted program listing further comprises creating the preference profile based on the channel of the highlighted program listing.

110. The method of claim 106 wherein creating the preference profile based on the characteristics of the highlighted program listing further comprises creating the preference profile based on the rating of the highlighted program listing.

111. The method of claim 88 further comprising:
allowing the user to tune to a selected program; and
modifying a preference profile with which the selected preference attributes and the selected preference levels are associated based on the characteristics of the selected program.

112. The method of claim 88 further comprising:
allowing the user to highlight a given program listing; and
modifying a preference profile with which the selected preference attributes and the selected preference levels are associated based on the characteristics of the highlighted program listing.

113. The method of claim 88 further comprising providing a profiles display with which the user may modify a preference profile with which the selected preference attributes and the selected preference levels are associated.

114. The method of claim 88 wherein displaying the hot list further comprises displaying the hot list sorted by start time.

115. The method of claim 88 wherein displaying the hot list further comprises displaying the hot list sorted by channel.

116. The method of claim 88 wherein displaying the hot list further comprises displaying the hot list sorted by priority.

117. The method of claim 116 wherein displaying the hot list sorted by priority further comprises displaying the hot list with pay-per-view programming having highest priority and being listed first.

118. The method of claim 89 further comprising allowing tuning to certain channels based on the selected preference attributes and selected preference levels.

119. The method of claim 118 further comprising providing an option of specifying a sort order for each of the selected preference attributes.

120. The method of claim 119 further comprising allowing tuning to certain channels based on the specified sort order.

121. The method of claim 88 further comprising monitoring which programs are watched by the user.

122. The method of claim 121 wherein monitoring which programs are watched by the user further comprises monitoring viewing times, channels, and frequencies.

123. The method of claim 121 further comprising automatically modifying a preference profile based on which programs are watched by the user.

124. The method of claim 123 further comprising providing an opportunity to review and modify automatic profile modifications made by the step of automatically modifying.

125. The method of claim 123 further comprising disabling the step of automatically modifying.

126. The method of claim 88 further comprising providing a personal identification number setup screen.

127. The method of claim 126 wherein providing the personal identification number setup screen further comprises providing a plurality of personal identification number options associated with a preference profile.

128. The method of claim 127 wherein providing the personal identification number options further comprises setting whether a personal identification number is required for activating the profile.

129. The method of claim 127 wherein providing the personal identification number options further comprises setting whether a personal identification number is required for deactivating the profile.

130. The method of claim 89 further comprising providing a personal identification number setup screen, wherein providing the personal identification number options further comprises:
providing a plurality of personal identification number options associated with a preference profile with which the selected preference attributes and the selected preference levels are associated; and
setting whether a personal identification number is required for viewing which preference attributes are associated with the profile.

131. The method of claim 89 further comprising providing a personal identification number setup screen, wherein providing the personal identification number options further comprises:
providing a plurality of personal identification number options associated with a preference profile with which the selected preference attributes and the selected preference levels are associated; and
setting whether a personal identification number is required for modifying which preference attributes have an associated preference level of illegal.

132. The method of claim 89 further comprising providing a personal identification number setup screen, wherein providing the personal identification number options further comprises:
providing a plurality of personal identification number options associated with a preference profile with which the selected preference attributes and the selected preference levels are associated; and
setting whether a personal identification number is required for modifying which preference attributes have an associated preference level of mandatory.

133. The method of claim 89 further comprising providing a personal identification number setup screen, wherein providing the personal identification number options further comprises:
providing a plurality of personal identification number options associated with a preference profile with which the selected preference attributes and the selected preference levels are associated; and
setting whether a personal identification number is required for modifying like and dislike preference levels.

134. The method of claim 89 wherein providing the option for the user to select a plurality of preference attributes further comprises providing an option of selecting a given airing of a program as a preference attribute.

135. The method of claim 134 further comprising allowing the given airing of the program selected as a preference attribute to expire after the program has been aired.

136. The method of claim 89 wherein providing the option for the user to select a plurality of preference attributes further comprises providing an option of selecting a broadcast characteristic as a preference attribute.

137. The method of claim 136 wherein providing the option of selecting a broadcast characteristic as a preference attribute further comprises providing closed-captioning as a preference attribute.

138. The method of claim 136 wherein providing the option of selecting a broadcast characteristic as a preference attribute further comprises providing second audio program as a preference attribute.

139. The method of claim 89 further comprising providing an option of specifying a sort order for each of the selected preference attributes.

140. The method of claim 139 further comprising displaying the list of programming based on the specified sort order.

141. The method of claim 89 further comprising providing the user with an option of selecting a preference scope.

142. The method of claim 141 further comprising displaying the list of programming based on the selected preference scope.

143. The method of claim 141 further comprising allowing tuning to certain channels based on the selected preference scope.

144. The method of claim 141 wherein providing the user with the option of selecting the preference scope further comprises selecting a preference scope selected from the group consisting of: narrow scope, moderate scope, and wide scope.

145. The method of claim 141 wherein the preference levels include like, dislike, illegal, and mandatory, and wherein providing the user with the option of selecting the preference scope further comprises selecting a preference scope that includes liked programs that are not more disliked and that have all mandatory attributes and no illegal attributes.

146. The method of claim 141 wherein the preference levels include like, dislike, illegal, and mandatory, and wherein providing the user with the option of selecting the preference scope further comprises selecting a preference scope that includes programs that have no disliked preference attributes and that have all mandatory attributes and no illegal attributes.

147. The method of claim 141 wherein the preference levels include like, dislike, illegal, and mandatory, and wherein providing the user with the option of selecting the preference scope further comprises selecting a preference scope that includes programs that have all mandatory attributes and no illegal attributes.

148. The method of claim 89 wherein providing the option for the user to select a plurality of preference attributes further comprises providing an option of selecting a type of channel as a preference attribute.

149. The method of claim 89 wherein providing the option for the user to select a plurality of preference attributes further comprises providing an option of selecting a program series as a preference attribute.

150. The method of claim 89 wherein providing the option for the user to select a plurality of preference attributes further comprises providing an option of selecting a genre of programming as a preference attribute.

151. The method of claim 89 wherein providing the option for the user to select a plurality of preference attributes further comprises providing an option of selecting at least one rating as a preference attribute.

152. The method of claim 89 wherein providing the option for the user to select a plurality of preference attributes further comprises providing an option of selecting a given actor or actress as a preference attribute.

153. The method of claim 89 wherein providing the option for the user to select a plurality of preference attributes further comprises providing an option of selecting a given topic as a preference attribute.

154. The method of claim 89 wherein providing the option for the user to select a plurality of preference attributes further comprises providing an option of selecting a word in a program description as a preference attribute.

155. The method of claim 89 wherein providing the option for the user to select a plurality of preference attributes further comprises providing an option of selecting a given program start time as a preference attribute.

156. The method of claim 89 wherein providing the option for the user to select a plurality of preference attributes further comprises providing an option of selecting a range of broadcast times as a preference attribute.

157. The method of claim 89 wherein providing the option for the user to select a plurality of preference attributes further comprises providing an option of selecting original programming as a preference attribute.

158. The method of claim 89 wherein providing the option for the user to select a plurality of preference attributes further comprises providing an option of selecting a given language as a preference attribute.

159. The method of claim 89 wherein providing the option for the user to select a plurality of preference attributes further comprises providing an option of selecting a critics rating as a preference attribute.

160. The method of claim 89 further comprising providing an option of deselecting at least one of the selected preference attributes.

161. The method of claim 89 wherein the preference levels include at least like and dislike.

162. The method of claim 89 wherein the preference levels include at least strong like and weak like.

163. The method of claim 89 wherein the preference levels include at least strong dislike and weak dislike.

164. The method of claim 88 further comprising providing an option for creating a master preference profile.

165. The method of claim 88 wherein a plurality of preference profiles including a master preference profile are active, the method further comprising resolving conflicts between preference profiles in favor of the master preference profile.

166. The method of claim 88 wherein a master preference profile that is accessed by a master personal identification number is used to define certain television viewing preferences, the method further comprising displaying the hot list of programs based on the master profile.

167. The method of claim 89 wherein a master preference profile that is accessed by a master personal identification number is used to define certain television viewing preferences, wherein displaying the hot list of programs further comprises displaying the hot list of programs based on selected preference attributes and selected preference levels in the master profile.

168. The method of claim 88 further comprising providing an opportunity for setting non-program settings associated with the preference profile.

169. The method of claim 88 further comprising providing an opportunity for setting non-program settings associated with the preference profile, wherein the non-program settings include audio settings for the user television equipment.

170. The method of claim 88 further comprising providing an opportunity for setting non-program settings associated with the preference profile, wherein the non-program settings include display settings.

171. The method of claim 88 further comprising:
   providing an opportunity for creating multiple preference profiles;

providing an option of selecting which of the profiles to make active; and providing access to a messaging service based on information on which profile is active.

172. The method of claim 88 wherein the hot list includes at least one program with an active non-expired reminder.

173. The method of claim 88 further comprising allowing the user to tune to a program on the hot list.

174. The method of claim 88 further comprising allowing the user to direct the television program guide system to display the hot list.

175. A system in which an interactive television program guide is implemented, the system comprising user television equipment configured to:

provide an option for a user to create a preference profile that is indicative of the user's television programming interests;

provide an option for the user to display a hot list a predetermined period of time before the scheduled broadcast times of programs on the hot list;

provide an option for the user to adjust the predetermined period of time; and display the hot list of programs on the display, wherein all of the programs on the hot list are based on the user's preference profile and all of the programs on the hot list are substantially currently available for viewing by the user.

176. The system of claim 175 wherein the user equipment configured to provide the option for the user to create the preference profile is further configured to:

provide an option for the user to select a plurality of preference attributes that are indicative of the user's television programming interests; and provide an option for the user to select one of at least several preference levels for each of the plurality of selected preference attributes, wherein the selected preference attributes and the selected preference levels are associated with the preference profile.

177. The system of claim 176 wherein the user equipment is further configured to provide an option of selecting a preference scope that is associated with the preference profile.

178. The system of claim 176 wherein there are multiple profiles, wherein the user equipment is further configured to provide an option of selecting which of the profiles to make active.

179. The system of claim 178 wherein the user equipment is further configured to provide turning on an auto-reminders feature.

180. The system of claim 179 wherein a given one of the profiles is active, wherein the user equipment is further configured to display automatic reminders when the auto-reminders feature is turned on based on the active profile just prior to the scheduled broadcast times of programs satisfying the active profile.

181. The system of claim 180 wherein the user equipment is further configured to:

provide a view now option for programs for which automatic reminders are displayed; and tune to a given one of the programs for which the automatic reminders are displayed when the user selects the view now option for that program.

182. The system of claim 178 wherein at least two of the preference profiles are active, and wherein the user equipment when configured to display the hot list of programs based on the at least two preference profiles is further configured to indicate which of the programs in the hot list of programs satisfy which of the preference profiles.

183. The system of claim 182 wherein the user equipment when configured to indicate is further configured to list the programs that satisfy one of the two profiles using one color and the programs that satisfy the other of the two profiles using another color.

184. The system of claim 182 wherein the user equipment when configured to indicate is further configured to list the programs that satisfy one of the two profiles using one pattern and the programs that satisfy the other of the two profiles using another pattern.

185. The system of claim 182 wherein the user equipment when configured to indicate is further configured to list the programs that satisfy one of the two profiles using one icon and the programs that satisfy the other of the two profiles using another icon.

186. The system of claim 178 wherein the user equipment when configured to display the hot list of programs is further configured to display the hot list of programs based on the multiple profiles.

187. The system of claim 178 wherein the user equipment is further is further configured to allow tuning to certain channels based on the multiple profiles.

188. The system of claim 175 wherein the user equipment is further configured to allow the user to tune to a selected program, wherein the user equipment when configured to provide the option of creating the preference profile is further configured to create the preference profile based on characteristics of the selected program.

189. The system of claim 188 wherein the user equipment when configured to create the preference profile based on the characteristics of the selected program is further configured to create the preference profile based on the title of the selected program.

190. The system of claim 188 wherein the user equipment when configured to create the preference profile based on the characteristics of the selected program is further configured to create the preference profile based on the genre of the selected program.

191. The system of claim 188 wherein the user equipment when configured to create the preference profile based on the characteristics of the selected program is further configured to create the preference profile based on the channel of the selected program.

192. The system of claim 188 wherein the user equipment when configured to create the preference profile based on the characteristics of the selected program further is further configured to create the preference profile based on the rating of the selected program.

193. The system of claim 175 wherein the user equipment is further configured to allow the user to highlight a given program listing, wherein the user equipment when configured to provide the option of creating the preference profile is further configured to create the preference profile based on characteristics of the highlighted program listing.

194. The system of claim 193 wherein the user equipment when configured to create the preference profile based on the characteristics of the highlighted program listing is further configured to create the preference profile based on the title of the highlighted program listing.

195. The system of claim 193 wherein the user equipment when configured to create the preference profile based on the characteristics of the highlighted program listing is further configured to create the preference profile based on the genre of the highlighted program listing.

196. The system of claim 193 wherein the user equipment when configured to create the preference profile based on the characteristics of the highlighted program listing is further configured to create the preference profile based on the channel of the highlighted program listing.

197. The system of claim 193 wherein the user equipment when configured to create the preference profile based on the characteristics of the highlighted program listing is further configured to create the preference profile based on the rating of the highlighted program listing.

198. The system of claim 175 wherein the user equipment is further configured to:
allow the user to tune to a selected program; and
modify a preference profile with which the selected preference attributes and the selected preference levels are associated based on the characteristics of the selected program.

199. The system of claim 175 wherein the user equipment is further configured to:
allow the user to highlight a given program listing; and
modify a preference profile with which the selected preference attributes and the selected preference levels are associated based on the characteristics of the highlighted program listing.

200. The system of claim 175 wherein the user equipment is further configured to provide a profiles display with which the user may modify a preference profile with which the selected preference attributes and the selected preference levels are associated.

201. The system of claim 175 wherein the user equipment when configured to display the hot list is further configured to display the hot list sorted by start time.

202. The system of claim 175 wherein the user equipment when configured to display the hot list is further configured to display the hot list sorted by channel.

203. The system of claim 175 wherein the user equipment when configured to display the hot list is further configured to display the hot list sorted by priority.

204. The system of claim 203 wherein the user equipment when configured to display the hot list sorted by priority is further configured to display the hot list with pay-per-view programming having highest priority and being listed first.

205. The system of claim 176 wherein the user equipment is further configured to allow tuning to certain channels based on the selected preference attributes and selected preference levels.

206. The system of claim 205 wherein the user equipment is further configured to provide an option of specifying a sort order for each of the selected preference attributes.

207. The system of claim 206 wherein the user equipment is further configured to allow tuning to certain channels based on the specified sort order.

208. The system of claim 175 wherein the user equipment is further configured to monitor which programs are watched by the user.

209. The system of claim 208 wherein the user equipment when configured to monitor which programs are watched by the user is further configured to monitor viewing times, channels, and frequencies.

210. The system of claim 208 wherein the user equipment is further configured to automatically modify a preference profile based on which programs are watched by the user.

211. The system of claim 210 wherein the user equipment is further configured to provide an opportunity to review and modify automatic profile modifications when configured to automatically modify the preference profile.

212. The system of claim 210 wherein the user equipment is further configured to disable the automatic modification.

213. The system of claim 175 wherein the user equipment is further configured to provide a personal identification number setup screen.

214. The system of claim 213 wherein the user equipment when configured to provide the personal identification number setup screen is further configured to provide a plurality of personal identification number options associated with a preference profile.

215. The system of claim 214 wherein the user equipment when configured to provide the personal identification number options is further configured to set whether a personal identification number is required for activating the profile.

216. The system of claim 214 wherein the user equipment when configured to provide the personal identification number options is further configured to set whether a personal identification number is required for deactivating the profile.

217. The system of claim 176 wherein the user equipment is further configured to provide a personal identification number setup screen, wherein the user equipment when configured to provide the personal identification number options is further configured to:
provide a plurality of personal identification number options associated with a preference profile with which the selected preference attributes and the selected preference levels are associated; and
set whether a personal identification number is required for viewing which preference attributes are associated with the profile.

218. The system of claim 176 wherein the user equipment is further configured to provide a personal identification number setup screen, wherein the user equipment when configured to provide the personal identification number options is further configured to:
provide a plurality of personal identification number options associated with a preference profile with which the selected preference attributes and the selected preference levels are associated; and
set whether a personal identification number is required for modifying which preference attributes have an associated preference level of illegal.

219. The system of claim 176 wherein the user equipment is further configured to provide a personal identification number setup screen, wherein the user equipment when configured to provide the personal identification number options is further configured to:
provide a plurality of personal identification number options associated with a preference profile with which the selected preference attributes and the selected preference levels are associated; and
set whether a personal identification number is required for modifying which preference attributes have an associated preference level of mandatory.

220. The system of claim 176 wherein the user equipment is further configured to provide a personal identification number setup screen, wherein the user equipment when configured to provide the personal identification number options is further configured to:
provide a plurality of personal identification number options associated with a preference profile with which the selected preference attributes and the selected preference levels are associated; and
set whether a personal identification number is required for modifying like and dislike preference levels.

221. The system of claim 176 wherein the user equipment when configured to provide the option for the user to select a plurality of preference attributes is further configured to provide an option of selecting a given airing of a program as a preference attribute.

222. The system of claim 221 wherein the user equipment is further configured to allow the given airing of the program selected as a preference attribute to expire after the program has been aired.

223. The system of claim 176 wherein the user equipment when configured to provide the option for the user to select a plurality of preference attributes is further configured to provide an option of selecting a broadcast characteristic as a preference attribute.

224. The system of claim 223 wherein the user equipment when configured to provide the option of selecting a broadcast characteristic as a preference attribute is further configured to provide closed-captioning as a preference attribute.

225. The system of claim 223 wherein the user equipment when configured to provide the option of selecting a broadcast characteristic as a preference attribute is further configured to provide second audio program as a preference attribute.

226. The system of claim 176 wherein the user equipment is further configured to provide an option of specifying a sort order for each of the selected preference attributes.

227. The system of claim 226 wherein the user equipment is further configured to display the list of programming based on the specified sort order.

228. The system of claim 176 wherein the user equipment is further configured to display the user with an option of selecting a preference scope.

229. The system of claim 228 wherein the user equipment is further configured to display the list of programming based on the selected preference scope.

230. The system of claim 228 wherein the user equipment is further configured to allow tuning to certain channels based on the selected preference scope.

231. The system of claim 228 wherein the user equipment when configured to provide the user with the option of selecting the preference scope is further configured to select a preference scope selected from the group consisting of: narrow scope, moderate scope, and wide scope.

232. The system of claim 228 wherein the preferences levels include like, dislike, illegal, and mandatory, and wherein the user equipment when configured to provide the user with the option of selecting the preference scope is further configured to select a preference scope that includes liked programs that are not more disliked and that have all mandatory attributes and no illegal attributes.

233. The system of claim 228 wherein the preference levels include like, dislike, illegal, and mandatory, and wherein the user equipment when configured to provide the user with the option of selecting the preference scope is further configured to select a preference scope that includes programs that have no disliked preference attributes and that have all mandatory attributes and no illegal attributes.

234. The system of claim 228 wherein the preference levels include like, dislike, illegal, and mandatory, and wherein the user equipment when configured to provide the user with the option of selecting the preference scope is further configured to select a preference scope that includes programs that have all mandatory attributes and no illegal attributes.

235. The system of claim 176 wherein the user equipment when configured to provide the option for the user to select a plurality of preference attributes is further configured to provide an option of selecting a type of channel as a preference attribute.

236. The system of claim 176 wherein the user equipment when configured to provide the option for the user to select a plurality of preference attributes is further configured to provide an option of selecting a program series as a preference attribute.

237. The system of claim 176 wherein the user equipment when configured to provide the option for the user to select a plurality of preference attributes is further configured to provide an option of selecting a genre of programming as a preference attribute.

238. The system of claim 176 wherein the user equipment when configured to provide the option for the user to select a plurality of preference attributes is further configured to provide an option of selecting at least one rating as a preference attribute.

239. The system of claim 176 wherein the user equipment when configured to provide the option for the user to select a plurality of preference attributes is further configured to provide an option of selecting a given actor or actress as a preference attribute.

240. The system of claim 176 wherein the user equipment when configured to provide the option for the user to select a plurality of preference attributes is further configured to provide an option of selecting a given topic as a preference attribute.

241. The system of claim 176 wherein the user equipment when configured to provide the option for the user to select a plurality of preference attributes is further configured to provide an option of selecting a word in a program description as a preference attribute.

242. The system of claim 176 wherein the user equipment when configured to provide the option for the user to select a plurality of preference attributes is further configured to provide an option of selecting a given program start time as a preference attribute.

243. The system of claim 176 wherein the user equipment when configured to provide the option for the user to select a plurality of preference attributes is further configured to provide an option of selecting a range of broadcast times as a preference attribute.

244. The system of claim 176 wherein the user equipment when configured to provide the option for the user to select a plurality of preference attributes is further configured to provide an option of selecting original programming as a preference attribute.

245. The system of claim 176 wherein the user equipment when configured to provide the option for the user to select a plurality of preference attributes is further configured to provide an option of selecting a given language as a preference attribute.

246. The system of claim 176 wherein the user equipment when configured to provide the option for the user to select a plurality of preference attributes is further configured to provide an option of selecting a critics rating as a preference attribute.

247. The system of claim 176 wherein the user equipment is further configured to provide an option of deselecting at least one of the selected preference attributes.

248. The system of claim 176 wherein the preference levels include at least like and dislike.

249. The system of claim 176 wherein the preference levels include at least strong like and weak like.

250. The system of claim 176 wherein the preference levels include at least strong dislike and weak dislike.

251. The system of claim 175 wherein the user equipment is further configured to provide an option for creating a master preference profile.

252. The system of claim 175 wherein a plurality of preference profiles including a master preference profile are active, wherein the user equipment is further configured to resolve conflicts between preference profiles in favor of the master preference profile.

253. The system of claim 175 wherein a master preference profile that is accessed by a master personal identification number is used to define certain television viewing preferences, wherein the user equipment is further configured to display the hot list of programs based on the master profile.

254. The system of claim 176 wherein a master preference profile that is accessed by a master personal identification number is used to define certain television viewing preferences, wherein the user equipment when configured to display the hot list of programs is further configured to display the hot list of programs based on selected preference attributes and selected preference levels in the master profile.

255. The system of claim 175 wherein the user equipment is further configured to provide an opportunity for setting non-program settings associated with the preference profile.

256. The system of claim 175 wherein the user equipment is further configured to provide an opportunity for setting non-program settings associated with the preference profile, wherein the non-program settings include audio settings for the user television equipment.

257. The system of claim 175 wherein the user equipment is further configured to provide an opportunity for setting non-program settings associated with the preference profile, wherein the non-program settings include display settings.

258. The system of claim 175 wherein the user equipment is further configured to:
provide an opportunity for creating multiple preference profiles;
provide an option of selecting which of the profiles to make active; and
provide access to a messaging service based on information on which profile is active.

259. The system of claim 175 wherein the hot list includes at least one program with an active non-expired reminder.

260. The system of claim 175 wherein the user equipment is further configured to allow the user to tune to a program on the hot list.

261. The system of claim 175 wherein the user equipment is further configured to allow the user to direct the television program guide system to display the hot list.

262. Machine-readable media for use in a television program guide system in which an television program guide system is implemented on user television equipment, wherein the media is encoded with machine-readable instructions for performing the method comprising:
providing an option for a user to create a preference profile that is indicative of the user's television programming interests;
providing an option for the user to display a hot list a predetermined period of time before the scheduled broadcast times of programs on the hot list;
providing an option for the user to adjust the predetermined period of time; and
displaying the hot list of programs on the user television equipment, wherein all of the programs on the hot list are based on the user's preference profile and all of the programs on the hot list are substantially currently available for viewing by the user.

263. The machine-readable media of claim 262 wherein providing the option for the user to create the preference profile further comprises:
providing an option for the user to select a plurality of preference attributes that are indicative of the user's television programming interests; and
providing an option for the user to select one of at least several preference levels for each of the plurality of selected preference attributes, wherein the selected preference attributes and the selected preference levels are associated with the preference profile.

264. The machine-readable media of claim 253 further encoded with machine-readable instructions for performing the method comprising providing an option of selecting a preference scope that is associated with the preference profile.

265. The machine-readable media of claim 263 wherein there are multiple profiles, the media further encoded with machine-readable instructions for performing the method comprising providing an option of selecting which of the profiles to make active.

266. The machine-readable media of claim 265 further encoded with machine-readable instructions for performing the method comprising turning on an auto-reminders feature.

267. The machine-readable media of claim 266 wherein a given one of the profiles is active, the media further encoded with machine-readable instructions for performing the method comprising displaying automatic reminders when the auto-reminders feature is turned on based on the active profile just prior to the scheduled broadcast times of programs satisfying the active profile.

268. The machine-readable media of claim 267 further encoded with machine-readable instructions for performing the method comprising:
providing a view now option for programs for which automatic reminders are displayed; and
tuning to a given one of the programs for which the automatic reminders are displayed when the user selects the view now option for that program.

269. The machine-readable media of claim 265 wherein at least two of the preference profiles are active, and wherein displaying the hot list of programs based on the at least two preference profiles further comprises indicating which of the programs in the hot list of programs satisfy which of the preference profiles.

270. The machine-readable media of claim 269 wherein indicating comprises listing the programs that satisfy one of the two profiles using one color and the programs that satisfy the other of the two profiles using another color.

271. The machine-readable media of claim 269 wherein indicating comprises listing the programs that satisfy one of the two profiles using one pattern and the programs that satisfy the other of the two profiles using another pattern.

272. The machine-readable media of claim 269 wherein indicating comprises listing the programs that satisfy one of the two profiles using one icon and the programs that satisfy the other of the two profiles using another icon.

273. The machine-readable media of claim 265 wherein displaying the hot list of programs further comprises displaying the hot list of programs based on the multiple profiles.

274. The machine-readable media of claim 265 further encoded with machine-readable instructions for performing the method of allowing tuning to certain channels based on the multiple profiles.

275. The machine-readable media of claim 262 further encoded with machine-readable instructions for performing the method comprising allowing the user to tune to a selected program, wherein providing the option of creating the preference profile further comprises creating the preference profile based on characteristics of the selected program.

276. The machine-readable media of claim 275 wherein creating the preference profile based on the characteristics of the selected program further comprises creating the preference profile based on the title of the selected program.

277. The machine-readable media of claim 275 wherein creating the preference profile based on the characteristics of the selected program further comprises creating the preference profile based on the genre of the selected program.

278. The machine-readable media of claim 275 wherein creating the preference profile based on the characteristics of the selected program further comprises creating the preference profile based on the channel of the selected program.

279. The machine-readable media of claim 275 wherein creating the preference profile based on the characteristics of the selected program further comprises creating the preference profile based on the rating of the selected program.

280. The machine-readable media of claim 262 further encoded with machine-readable instructions for performing the method comprising allowing the user to highlight a given program listing, wherein providing the option of creating the preference profile further comprises creating the preference profile based on characteristics of the highlighted program listing.

281. The machine-readable media of claim 280 wherein creating the preference profile based on the characteristics of the highlighted program listing further comprises creating the preference profile based on the title of the highlighted program listing.

282. The machine-readable media of claim 280 wherein creating the preference profile based on the characteristics of the highlighted program listing further comprises creating the preference profile based on the genre of the highlighted program listing.

283. The machine-readable media of claim 280 wherein creating the preference profile based on the characteristics of the highlighted program listing further comprises creating the preference profile based on the channel of the highlighted program listing.

284. The machine-readable media of claim 280 wherein creating the preference profile based on the characteristics of the highlighted program listing further comprises creating the preference profile based on the rating of the highlighted program listing.

285. The machine-readable media of claim 262 further encoded with machine-readable instructions for performing the method comprising:
  allowing the user to tune to a selected program; and
  modifying a preference profile with which the selected preference attributes and the selected preference levels are associated based on the characteristics of the selected program.

286. The machine-readable media of claim 262 further encoded with machine-readable instructions for performing the method comprising:
  allowing the user to highlight a given program listing; and
  modifying a preference profile with which the selected preference attributes and the selected preference levels are associated based on the characteristics of the highlighted program listing.

287. The machine-readable media of claim 262 further encoded with machine-readable instructions for performing the method comprising providing a profiles display with which the user may modify a preference profile with which the selected preference attributes and the selected preference levels are associated.

288. The machine-readable media of claim 262 wherein displaying the hot list further comprises displaying the hot list sorted by start time.

289. The machine-readable media of claim 262 wherein displaying the hot list further comprises displaying the hot list sorted by channel.

290. The machine-readable media of claim 262 wherein displaying the hot list further comprises displaying the hot list sorted by priority.

291. The machine-readable media of claim 290 wherein displaying the hot list sorted by priority further comprises displaying the hot list with pay-per-view programming having highest priority and being listed first.

292. The machine-readable media of claim 263 further encoded with machine-readable instructions for performing the method comprising allowing tuning to certain channels based on the selected preference attributes and selected preference levels.

293. The machine-readable media of claim 292 further encoded with machine-readable instructions for performing the method comprising providing an option of specifying a sort order for each of the selected preference attributes.

294. The machine-readable media of claim 293 further encoded with machine-readable instructions for performing the method comprising allowing tuning to certain channels based on the specified sort order.

295. The machine-readable media of claim 262 further encoded with machine-readable instructions for performing the method comprising monitoring which programs are watched by the user.

296. The machine-readable media of claim 295 wherein monitoring which programs are watched by the user further comprises monitoring viewing times, channels, and frequencies.

297. The machine-readable media of claim 295 further encoded with machine-readable instructions for performing the method comprising automatically modifying a preference profile based on which programs are watched by the user.

298. The machine-readable media of claim 297 further encoded with machine-readable instructions for performing the method comprising providing an opportunity to review and modify automatic profile modifications made by the step of automatically modifying.

299. The machine-readable media of claim 297 further encoded with machine-readable instructions for performing the method comprising disabling the step of automatically modifying.

300. The machine-readable media of claim 262 further encoded with machine-readable instructions for performing the method comprising providing a personal identification number setup screen.

301. The machine-readable media of claim 300 wherein providing the personal identification number setup screen further comprises providing a plurality of personal identification number options associated with a preference profile.

302. The machine-readable media of claim 301 providing the personal identification number options further comprises setting whether a personal identification number is required for activating the profile.

303. The machine-readable media of claim 301 wherein providing the personal identification number options further comprises setting whether a personal identification number is required for deactivating the profile.

304. The machine-readable media of claim 263 further encoded with machine-readable instructions for performing the method comprising providing a personal identification number setup screen, wherein providing the personal identification number options further comprises:
 providing a plurality of personal identification number options associated with a preference profile with which the selected preference attributes and the selected preference levels are associated; and
 setting whether a personal identification number is required for viewing which preference attributes are associated with the profile.

305. The machine-readable media of claim 263 further encoded with machine-readable instructions for performing the method comprising providing a personal identification number setup screen, wherein providing the personal identification number options further comprises:
 providing a plurality of personal identification number options associated with a preference profile with which the selected preference attributes and the selected preference levels are associated; and
 setting whether a personal identification number is required for modifying which preference attributes have an associated preference level of illegal.

306. The machine-readable media of claim 263 further encoded with machine-readable instructions for performing the method comprising providing a personal identification number setup screen, wherein providing the personal identification number options further comprises:
 providing a plurality of personal identification number options associated with a preference profile with which the selected preference attributes and the selected preference levels are associated; and
 setting whether a personal identification number is required for modifying which preference attributes have an associated preference level of mandatory.

307. The machine-readable media of claim 263 further encoded with machine-readable instructions for performing the method comprising providing a personal identification number setup screen, wherein providing the personal identification number options further comprises:
 providing a plurality of personal identification number options associated with a preference profile with which the selected preference attributes and the selected preference levels are associated; and
 setting whether a personal identification number is required for modifying like and dislike preference levels.

308. The machine-readable media of claim 263 wherein providing the option for the user to select a plurality of preference attributes further comprises providing an option of selecting a given airing of a program as a preference attribute.

309. The machine-readable media of claim 134 further comprising allowing the given airing of the program selected as a preference attribute to expire after the program has been aired.

310. The machine-readable media of claim 263 wherein providing the option for the user to select a plurality of preference attributes further comprises providing an option of selecting a broadcast characteristic as a preference attribute.

311. The machine-readable media of claim 310 wherein providing the option of selecting a broadcast characteristic as a preference attribute further comprises providing closed-captioning as a preference attribute.

312. The machine-readable media of claim 310 wherein providing the option of selecting a broadcast characteristic as a preference attribute further comprises providing second audio program as a preference attribute.

313. The machine-readable media of claim 263 further encoded with machine-readable instructions for performing the method comprising providing an option of specifying a sort order for each of the selected preference attributes.

314. The machine-readable media of claim 139 further encoded with machine-readable instructions for performing the method comprising displaying the list of programming based on the specified sort order.

315. The machine-readable media of claim 263 further encoded with machine-readable instructions for performing the method comprising providing the user with an option of selecting a preference scope.

316. The machine-readable media of claim 315 further encoded with machine-readable instructions for performing the method comprising displaying the list of programming based on the selected preference scope.

317. The machine-readable media of claim 315 further comprising allowing tuning to certain channels based on the selected preference scope.

318. The machine-readable media of claim 315 wherein providing the user with the option of selecting the preference scope further comprises selecting a preference scope selected from the group consisting of: narrow scope, moderate scope, and wide scope.

319. The machine-readable media of claim 315 wherein the preference levels include like, dislike, illegal, and mandatory, and wherein providing the user with the option of selecting the preference scope further comprises selecting a preference scope that includes liked programs that are not more disliked and that have all mandatory attributes and no illegal attributes.

320. The machine-readable media of claim 315 wherein the preference levels include like, dislike, illegal, and mandatory, and wherein providing the user with the option of selecting the preference scope further comprises selecting a preference scope that includes programs that have no disliked preference attributes and that have all mandatory attributes and no illegal attributes.

321. The machine-readable media of claim 315 wherein the preference levels include like, dislike, illegal, and mandatory, and wherein providing the user with the option of selecting the preference scope further comprises selecting a preference scope that includes programs that have all mandatory attributes and no illegal attributes.

322. The machine-readable media of claim 263 wherein providing the option for the user to select a plurality of preference attributes further comprises providing an option of selecting a type of channel as a preference attribute.

323. The machine-readable media of claim 263 wherein providing the option for the user to select a plurality of preference attributes further comprises providing an option of selecting a program series as a preference attribute.

324. The machine-readable media of claim 263 wherein providing the option for the user to select a plurality of preference attributes further comprises providing an option of selecting a genre of programming as a preference attribute.

325. The machine-readable media of claim 263 wherein providing the option for the user to select a plurality of preference attributes further comprises providing an option of selecting at least one rating as a preference attribute.

326. The machine-readable media of claim 263 wherein providing the option for the user to select a plurality of preference attributes further comprises providing an option of selecting a given actor or actress as a preference attribute.

327. The machine-readable media of claim 263 wherein providing the option for the user to select a plurality of preference attributes further comprises providing an option of selecting a given topic as a preference attribute.

328. The machine-readable media of claim 263 wherein providing the option for the user to select a plurality of preference attributes further comprises providing an option of selecting a word in a program description as a preference attribute.

329. The machine-readable media of claim 263 wherein providing the option for the user to select a plurality of preference attributes further comprises providing an option of selecting a given program start time as a preference attribute.

330. The machine-readable media of claim 263 wherein providing the option for the user to select a plurality of preference attributes further comprises providing an option of selecting a range of broadcast times as a preference attribute.

331. The machine-readable media of claim 263 wherein providing the option for the user to select a plurality of preference attributes further comprises providing an option of selecting original programming as a preference attribute.

332. The machine-readable media of claim 263 wherein providing the option for the user to select a plurality of preference attributes further comprises providing an option of selecting a given language as a preference attribute.

333. The machine-readable media of claim 263 wherein providing the option for the user to select a plurality of preference attributes further comprises providing an option of selecting a critics rating as a preference attribute.

334. The machine-readable media of claim 263 further encoded with machine-readable instructions for performing the method comprising providing an option of deselecting at least one of the selected preference attributes.

335. The machine-readable media of claim 263 wherein the preference levels include at least like and dislike.

336. The machine-readable media of claim 263 wherein the preference levels include at least strong like and weak like.

337. The machine-readable media of claim 263 wherein the preference levels include at least strong dislike and weak dislike.

338. The machine-readable media of claim 262 further encoded with machine-readable instructions for performing the method comprising providing an option for creating a master preference profile.

339. The machine-readable media of claim 262 wherein a plurality of preference profiles including a master preference profile are active, the media further encoded with machine-readable instructions for performing the method comprising resolving conflicts between preference profiles in favor of the master preference profile.

340. The machine-readable media of claim 262 wherein a master preference profile that is accessed by a master personal identification number is used to define certain television viewing preferences, the media further encoded with machine-readable instructions for performing the method comprising displaying the hot list of programs based on the master profile.

341. The machine-readable media of claim 263 wherein a master preference profile that is accessed by a master personal identification number is used to define certain television viewing preferences, wherein displaying the hot list of programs further comprises displaying the hot list of programs based on selected preference attributes and selected preference levels in the master profile.

342. The machine-readable media of claim 262 further comprising providing an opportunity for setting non-program settings associated with the preference profile.

343. The machine-readable media of claim 262 further comprising providing an opportunity for setting non-program settings associated with the preference profile, wherein the non-program settings include audio settings for the user television equipment.

344. The machine-readable media of claim 262 further comprising providing an opportunity for setting non-program settings associated with the preference profile, wherein the non-program settings include display settings.

345. The machine-readable media of claim 262 further comprising:
  providing an opportunity for creating multiple preference profiles;
  providing an option of selecting which of the profiles to make active; and
  providing access to a messaging service based on information on which profile is active.

346. The machine-readable media of claim 262 wherein the hot list includes at least one program with an active non-expired reminder.

347. The machine-readable media of claim 262 further encoded with machine-readable instructions for performing the method comprising allowing the user to tune to a program on the hot list.

348. The machine-readable media of claim 262 further encoded with machine-readable instructions for performing the method comprising allowing the user to direct the television program guide system to display the hot list.

* * * * *